(12) United States Patent
Kim et al.

(10) Patent No.: US 11,217,875 B2
(45) Date of Patent: Jan. 4, 2022

(54) ELECTRONIC DEVICE COMPRISING ANTENNA

(71) Applicant: Samsung Electronics Co., Ltd., Gyeonggi-do (KR)

(72) Inventors: Dong Yeon Kim, Gyeonggi-do (KR); Jun Hwa Oh, Seoul (KR); Hyung Joo Lee, Gyeonggi-do (KR); Soon Ho Hwang, Seoul (KR); Sung Hyup Lee, Gyeonggi-do (KR); Yoon Jae Lee, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 15/935,504

(22) Filed: Mar. 26, 2018

(65) Prior Publication Data
US 2018/0277934 A1 Sep. 27, 2018

(30) Foreign Application Priority Data
Mar. 24, 2017 (KR) .................. 10-2017-0037523

(51) Int. Cl.
| | | |
|---|---|---|
| *H01Q 1/24* | (2006.01) | |
| *H01Q 1/38* | (2006.01) | |
| *H01Q 9/42* | (2006.01) | |
| *H04M 1/02* | (2006.01) | |

(52) U.S. Cl.
CPC .............. *H01Q 1/243* (2013.01); *H01Q 1/38* (2013.01); *H01Q 9/42* (2013.01); *H04M 1/026* (2013.01)

(58) Field of Classification Search
None
See application file for complete search history.

(56) References Cited

U.S. PATENT DOCUMENTS

| | | | |
|---|---|---|---|
| 6,347,044 B1 * | 2/2002 | Won ..................... | G06F 1/1616 |
| | | | 174/138 G |
| 7,369,091 B2 | 5/2008 | Man et al. | |
| 7,511,673 B2 | 3/2009 | Man et al. | |
| 7,940,222 B2 | 5/2011 | Man et al. | |

(Continued)

FOREIGN PATENT DOCUMENTS

| | | |
|---|---|---|
| CN | 203071225 | 7/2013 |
| CN | 103985953 | 8/2014 |

(Continued)

OTHER PUBLICATIONS

Definition of term "Spaced", retrieved from https://www.dictionary.com/browse/space?s=t (Year: 2019).*

(Continued)

*Primary Examiner* — Gennadiy Tsvey
(74) *Attorney, Agent, or Firm* — The Farrell Law Firm, P.C.

(57) ABSTRACT

An electronic device includes a cover glass, a display exposed through the cover glass, a housing for mounting the display, a first printed circuit board (PCB) and a second PCB that are disposed inside the housing, a back cover coupled to the housing, a first antenna element electrically connected to a ground area through the first PCB, and a communication circuit feeding the first antenna element and transmitting or receiving a signal through the first antenna element. A spaced distance between the first PCB and the display is longer than a spaced distance between the second PCB and the display.

13 Claims, 20 Drawing Sheets

(56) References Cited

U.S. PATENT DOCUMENTS

| | | |
|---|---|---|
| 8,032,186 B2 | 10/2011 | Ryu et al. |
| 8,264,837 B2 | 9/2012 | Pakula et al. |
| 8,320,972 B2 | 11/2012 | Ryu et al. |
| 8,564,487 B2 | 10/2013 | Man et al. |
| 8,847,829 B2 | 9/2014 | Man et al. |
| 9,263,795 B2 | 2/2016 | Man et al. |
| 9,608,312 B2 | 3/2017 | Gu et al. |
| 9,627,754 B2 | 4/2017 | Na |
| 9,685,693 B2 | 6/2017 | Kanj et al. |
| 9,722,300 B2 | 8/2017 | Choi et al. |
| 9,867,301 B2 | 1/2018 | Pakula et al. |
| 9,882,266 B2 | 1/2018 | Wang et al. |
| 10,283,870 B2 * | 5/2019 | Nishizono ............... H01Q 5/328 |
| 2003/0042042 A1 * | 3/2003 | Jo ............................ B32B 7/00 174/254 |
| 2008/0055163 A1 | 3/2008 | Man et al. |
| 2008/0132284 A1 | 6/2008 | Ryu et al. |
| 2008/0186240 A1 | 8/2008 | Man et al. |
| 2009/0160715 A1 | 6/2009 | Man et al. |
| 2011/0210894 A1 | 9/2011 | Man et al. |
| 2011/0287813 A1 | 11/2011 | Ryu et al. |
| 2012/0019940 A1 * | 1/2012 | Lu ........................... G02B 7/025 359/819 |
| 2012/0087065 A1 * | 4/2012 | Kim ....................... G06F 1/1656 361/679.01 |
| 2012/0299785 A1 * | 11/2012 | Bevelacqua ........... H01Q 5/328 343/702 |
| 2013/0201067 A1 * | 8/2013 | Hu ........................ H01Q 9/0421 343/745 |
| 2013/0257659 A1 * | 10/2013 | Darnell .................. H01Q 1/243 343/702 |
| 2013/0267284 A1 * | 10/2013 | Ryu ........................ H04B 1/18 455/575.7 |
| 2014/0022130 A1 | 1/2014 | Man et al. |
| 2014/0071022 A1 | 3/2014 | Na |
| 2014/0078008 A1 * | 3/2014 | Kang ....................... H01Q 1/38 343/702 |
| 2014/0159982 A1 * | 6/2014 | De Luis ................. H01Q 5/378 343/843 |
| 2014/0232607 A1 * | 8/2014 | Lee ........................ H01Q 1/526 343/841 |
| 2014/0266922 A1 * | 9/2014 | Jin ........................ H01Q 5/314 343/702 |
| 2014/0266938 A1 * | 9/2014 | Ouyang ................. H01Q 5/378 343/729 |
| 2014/0333486 A1 * | 11/2014 | Greetis .................. H01Q 1/243 343/702 |
| 2014/0368390 A1 | 12/2014 | Man et al. |
| 2015/0340761 A1 * | 11/2015 | Feng .................... H01Q 9/0442 343/724 |
| 2015/0372372 A1 * | 12/2015 | Lee ........................ H01Q 1/243 343/702 |
| 2016/0056531 A1 * | 2/2016 | Lee ........................ H01Q 1/243 343/702 |
| 2016/0064820 A1 * | 3/2016 | Kim ......................... H01Q 7/00 343/767 |
| 2016/0079652 A1 | 3/2016 | Gu et al. |
| 2016/0079653 A1 | 3/2016 | Kanj et al. |
| 2016/0079654 A1 | 3/2016 | Wang et al. |
| 2016/0079655 A1 | 3/2016 | Gu et al. |
| 2016/0079656 A1 * | 3/2016 | Tsai ....................... H01Q 1/243 343/750 |
| 2016/0164167 A1 | 6/2016 | Choi et al. |
| 2016/0190690 A1 * | 6/2016 | Badran ..................... H01Q 1/42 343/750 |
| 2016/0226130 A1 * | 8/2016 | Allore ................... H05K 5/0247 |
| 2016/0254590 A1 * | 9/2016 | Seo ........................ H01Q 1/243 343/876 |
| 2016/0277062 A1 * | 9/2016 | Cheon ..................... H04B 1/48 |
| 2016/0301139 A1 * | 10/2016 | Lombardi ................ H01Q 1/42 |
| 2016/0365621 A1 * | 12/2016 | Yong ...................... H01Q 5/335 |
| 2017/0033460 A1 * | 2/2017 | Ayala Vazquez .... H01Q 13/103 |
| 2017/0068288 A1 | 3/2017 | Uttermann et al. |
| 2018/0048049 A1 * | 2/2018 | Toivanen ................. H01Q 5/35 |
| 2018/0048050 A1 * | 2/2018 | Sayem ................... H01Q 21/28 |
| 2018/0069306 A1 * | 3/2018 | Xue ........................ H01Q 1/243 |
| 2018/0132372 A1 | 5/2018 | Pakula et al. |
| 2019/0052292 A1 | 2/2019 | Seo et al. |
| 2019/0196641 A1 * | 6/2019 | Ryu ........................ G06F 3/0414 |

FOREIGN PATENT DOCUMENTS

| | | |
|---|---|---|
| EP | 3 032 647 | 6/2016 |
| EP | 3 062 393 | 8/2016 |
| EP | 3 321 765 | 5/2018 |
| EP | 3 379 647 | 9/2018 |
| EP | 3 490 058 | 5/2019 |
| JP | 2009-089305 | 4/2009 |
| KR | 1020120127954 | 11/2012 |
| WO | WO 2018/221879 | 12/2018 |
| WO | WO 2019/050332 | 3/2019 |

OTHER PUBLICATIONS

Definition of term "Through", retrieved from https://www.dictionary.com/browse/through?s=t (Year: 2019).*

International Search Report dated Jul. 4, 2018 issued in counterpart application No. PCT/KR2018/003303, 12 pages.

European Search Report dated Aug. 14, 2018 issued in counterpart application No. 18163228.2-1205, 10 pages.

European Search Report dated Jul. 17, 2019 issued in counterpart application No. 18163228.2-1205, 10 pages.

Chinese Office Action dated Jan. 3, 2020 issued in counterpart application No. 201810255334.1, 25 pages.

* cited by examiner

ELECTRONIC DEVICE COMPRISING ANTENNA

CROSS-REFERENCE TO RELATED APPLICATION(S)

This application is based on and claims priority under 35 U.S.C. § 119 to Korean Patent Application No. 10-2017-0037523, filed on Mar. 24, 2017, in the Korean Intellectual Property Office, the disclosure of which is incorporated herein by reference.

BACKGROUND

1. Field

The disclosure relates to a technology for securing the performance of an antenna.

2. Description of Related Art

With the development of mobile communication technologies, an electronic device, which is equipped, such as a smartphone or a wearable device having a display, has been widely supplied. The electronic device may execute various functions such as a photo or video capturing function, a music or video file playing function, a game function, and an Internet function through the display.

However, when the size of a display is small, it is inconvenient to execute the above-described functions. For example, unlike user intent, a plurality of icons may be simultaneously selected by a touch input using a user's finger because icons are small in a small-size display. In this case, an application that a user does not desire may be executed or a user input may be ignored. Accordingly, technologies for maximizing the size of the display have been recently developed, such as technologies associated with a full front display have been developed.

If the size of a display increases, the radiation space of each antenna element may decrease. For example, if the size of the display increases, the width between the antenna elements and a ground area may decrease and the radiation space of the antenna elements may also decrease. If the radiation space of each of the antenna elements decreases, the radiation efficiency of the antenna elements may decrease.

SUMMARY

Embodiments of the disclosure are to address at least the above-mentioned problems and/or disadvantages and to provide at least the advantages described below.

In accordance with an embodiment, an electronic device includes a cover glass, a display exposed through the cover glass, a housing for mounting the display, a first printed circuit board (PCB) and a second PCB that are disposed inside the housing, a back cover coupled to the housing, a first antenna element electrically connected to a ground area through the first PCB, and a communication circuit feeding the first antenna element and transmitting or receiving a signal through the first antenna element. A spaced distance between the first PCB and the display is longer than a spaced distance between the second PCB and the display.

In accordance with another embodiment, an electronic device includes a cover glass, a display exposed through the cover glass, a housing for mounting the display, a back cover coupled to the housing, a first PCB placed between the housing and the back cover and disposed on a first plane, a second PCB disposed on a second plane placed between the first plane and the back cover and, an antenna element electrically connected to a ground area through the second PCB, and a communication circuit feeding the antenna element and transmitting or receiving a signal through the antenna element.

In accordance with another embodiment, an electronic device includes a housing including a first plate, a second plate facing a direction opposite to the first plate, and a side surface member surrounding a space between the first plate and the second plate and including at least one conductive structure, a touch screen display exposed through a part of the first plate, a first PCB interposed between the display and the second plate, a wireless communication circuit mounted on the first PCB, at least one processor mounted on the first PCB, and a second PCB interposed between the display and the second plate and not overlapped with the first PCB when viewed from the top of the first plate. The second PCB may include a first plane and a second plane that are parallel to the first plate. A distance between the first plane and the first plate may be shorter than a distance between the second plane and the first plate. The second plane may include a conductive layer electrically connected to at least part of the conductive structure.

According to embodiments of the disclosure, the performance of an antenna may be secured.

BRIEF DESCRIPTION OF THE DRAWINGS

The above and other aspects, features and advantages of certain embodiments will be more apparent from the following description taken in conjunction with the accompanying drawings, in which.

DETAILED DESCRIPTION

Figure 1:
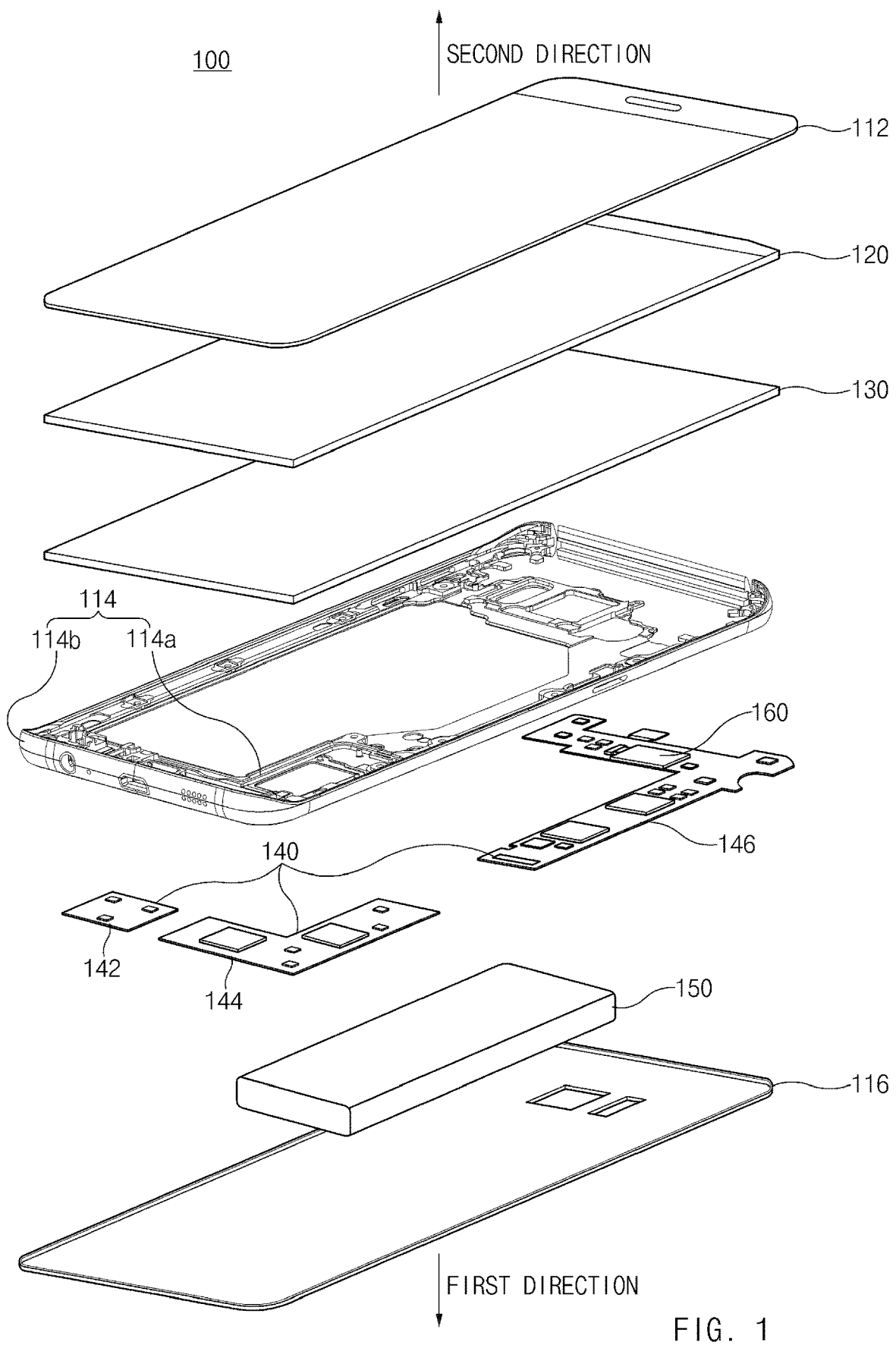
FIG. 1 illustrates an exploded perspective view of an electronic device, according to an embodiment.

FIG. 1 illustrates an exploded perspective view of an electronic device, according to an embodiment.

Referring to FIG. 1, an electronic device 100 includes a cover glass 112, a display 120, a shield layer 130, a housing 114, a PCB 140, a battery 150, a communication circuit 160, and a back cover 116. According to an embodiment, the electronic device 100 may be implemented without some of the elements illustrated in FIG. 1 or may be implemented to further include one or more additional elements not illustrated in FIG. 1. In addition, the stacking order of the elements included in the electronic device 100 may be different from the stacking order illustrated in FIG. 1.

The cover glass 112 may transmit light generated by the display 120. Also, a user may touch a portion (e.g., a finger) of his/her body on the cover glass 112 to perform a touch (including a contact using an electronic pen). The cover glass 112 may be formed of tempered glass, reinforced plastics, or a flexible polymer material. The cover glass 112 may be also referred to as a "glass window".

The housing 114 may protect the elements included in the electronic device 100. The display 120, the PCB 140, the battery 150 may be contained inside the housing 114, and the housing 114 may protect the elements from an external shock.

The housing 114 may include a support member 114a (e.g., a bracket), which is not exposed outside the electronic device 100, and a side surface member 114b exposed outside the electronic device 100. The support member 114a may support components (e.g., the display 120 and the PCB 140) included in the electronic device 100. The side surface member 114b may at least partly include a conductive material (e.g., metal). For example, the side surface member 114b formed of a metal material may be referred to as a metal bezel. At least part of the metal bezel may be used as an antenna element for transmitting and receiving a signal of a specified frequency band.

The back cover 116 may be coupled to the housing 114 and may include tempered glass, plastic, and/or metal. The back cover 116 may also be integrated with the housing 114 or may be implemented to be removable by the user.

The display 120 may be interposed between the cover glass 112 and the shield layer 130. The display 120 may be electrically connected to the PCB 140 so as to output content (e.g., a text, an image, a video, an icon, a widget, or a symbol). The display 120 may receive a touch input (e.g., a touch, a gesture, or a hovering) from a user.

The shield layer 130 may be interposed between the display 120 and the support member 114a. The shield layer 130 may shield electromagnetic waves generated between the display 120 and the PCB 140 to prevent electro-magnetic interference between the display 120 and the PCB 140.

The shield layer 130 may include a thin film, a sheet, or a plate that is formed of copper (Cu) or graphite. When the shield layer 130 is formed of Cu or graphite, at least part of the elements included in the electronic device 100 may be grounded to the shield layer 130.

The PCB 140 may mount various types of components, elements, or printed circuits of the electronic device 100. For example, the PCB 140 may mount an application processor (AP), a communication processor (CP), or the communication circuit 160. In the disclosure, the PCB 140 may be referred to as a main board, or a printed board assembly (PBA).

The PCB 140 may include a first PCB 142, a second PCB 144, and a third PCB 146. The first PCB 142 or the second PCB 144 may correspond to a sub PCB disposed in the lower end of the electronic device 100. In addition, the third PCB 146 may correspond to a main PCB electrically connected to the sub PCB. The main PCB may be a PCB on which a processor is mounted.

At least one of the first PCB 142, the second PCB 144, and the third PCB 146 may be disposed on different planes. For example, the first PCB 142 may be disposed on the back cover 116, and the second PCB 144 and the third PCB 146 may be disposed on the support member 114a.

The first PCB 142, the second PCB 144, and/or the third PCB 146 may be electrically connected to each other. For example, the first PCB 142 and the second PCB 144 may be electrically connected to each other through a specified connector or a specified wiring (e.g., a flexible printed circuit board (FPCB)).

The battery 150 may convert chemical energy and electrical energy bidirectionally. For example, the battery 150 may convert chemical energy into electrical energy and may supply the converted electrical energy to the display 120 and various elements or modules mounted on the PCB 140. The battery 150 may convert and store electrical energy from the outside as chemical energy. A power management module for managing charging and discharging of the battery 150 may be included in the PCB 140.

The communication circuit 160 may be disposed on the first PCB 142, the second PCB 144, or the third PCB 146 of the PCB 140. The communication circuit 160 may feed an antenna element to transmit or receive a signal. "Feeding" may mean an operation in which the communication circuit 160 applies a current to the antenna element.

Figure 2A:
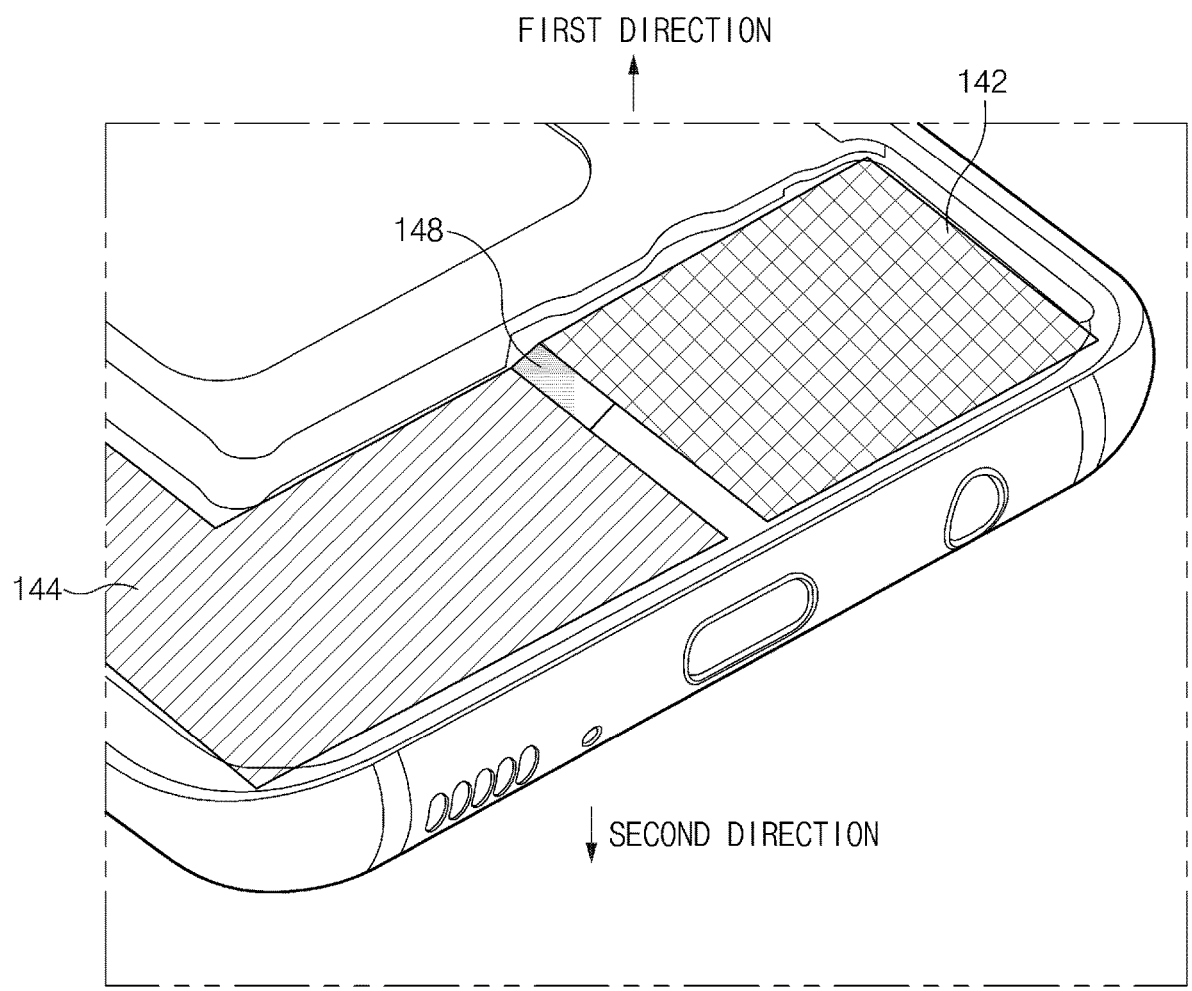
FIG. 2A is a view obtained by enlarging a stacked structure of a first PCB and a second PCB, according to an embodiment.

FIG. 2A is a view obtained by enlarging a stacked structure of a first PCB and a second PCB, according to an embodiment.

Referring to FIG. 2A, an electronic device in which the back cover 116 is removed is illustrated in a state where the display 120 is disposed to face a second direction. As used herein, a first direction may mean a direction toward which the back cover 116 faces, and a second direction may mean a direction toward which the display 120 faces.

Figure 2B:
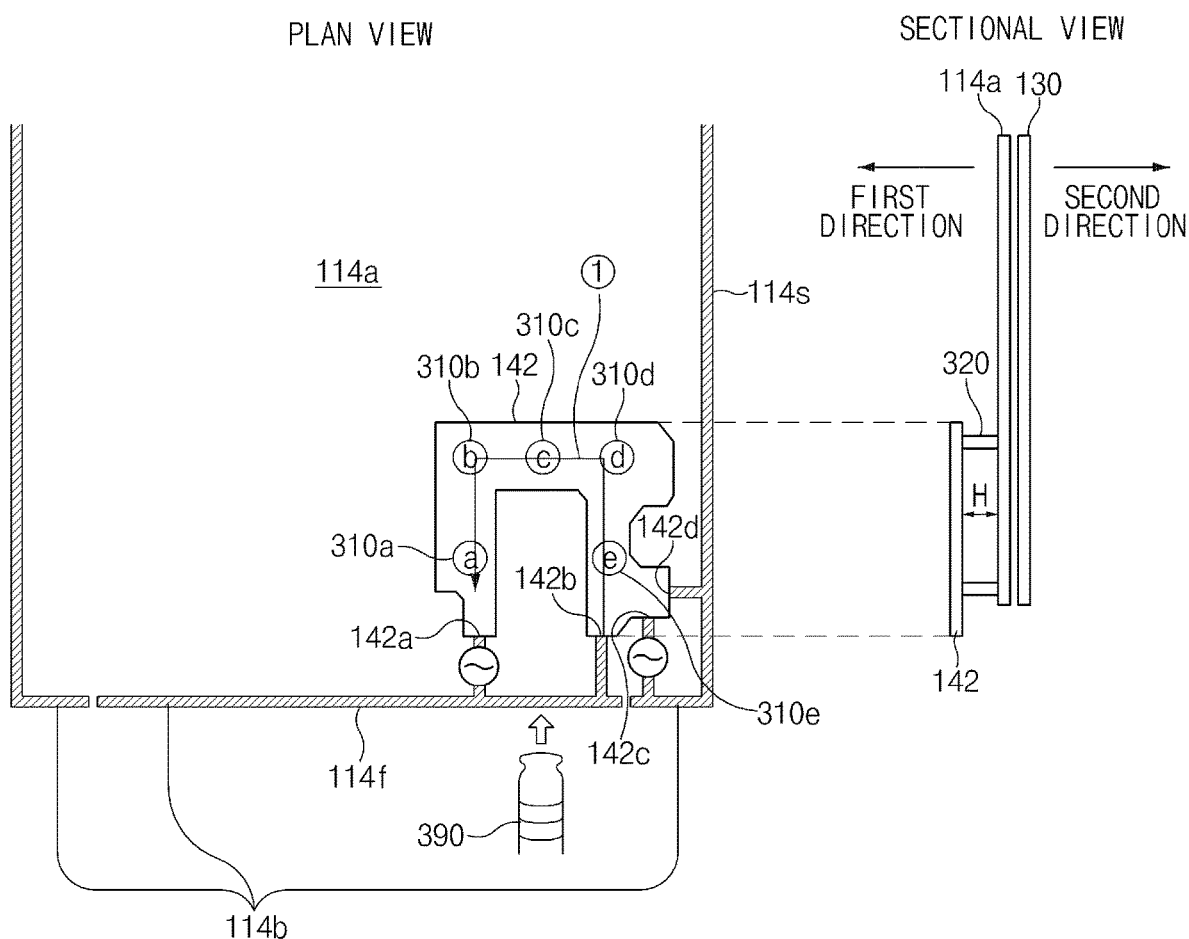
FIG. 2B illustrates a plan view and a sectional view of the electronic device, according to an embodiment.

FIG. 2B illustrates a plan view and a sectional view of the electronic device, according to an embodiment.

Figure 2C:
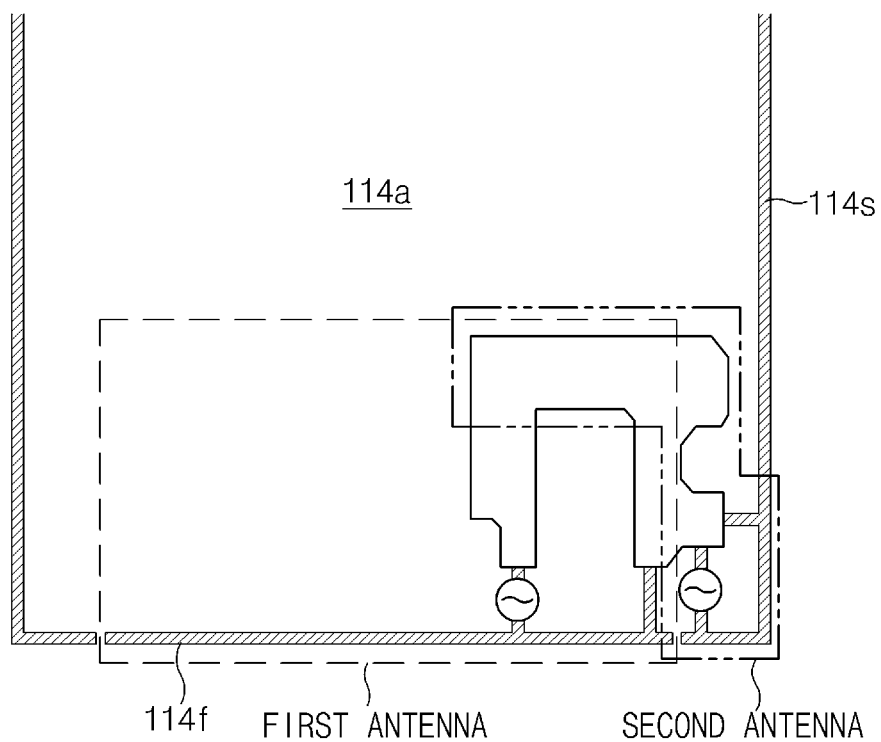
FIG. 2C illustrates a first antenna and a second antenna, according to an embodiment.

FIG. 2C illustrates a first antenna and a second antenna, according to an embodiment.

Referring to FIG. 2A, the first PCB 142 may be spaced apart from the second PCB 144 in the first direction. For example, there may be a height difference between the plane where the first PCB 142 is disposed and the plane where the second PCB 144 is disposed. As such, a spaced distance between the first PCB 142 and the display 120 may be longer than a spaced distance between the second PCB 144 and the display 120. In other words, with respect to the back cover 116, a spaced distance between the first PCB 142 and the back cover 116 may be less than a spaced distance between the second PCB 144 and the back cover 116

The first PCB 142 and the second PCB 144 may be electrically connected to each other. For example, since the first PCB 142 and the second PCB 144 are not disposed on the same plane, the first PCB 142 and the second PCB 144 may be electrically connected to each other through a FPCB 148 or an electrical connection member.

Referring to FIGS. 2B and 2C, at least part of the side surface member 114b may operate as an antenna element. The side surface member 114b may include a metal area or a non-metal area. A first area of the metal area of the side surface member 114b may operate as a first antenna element 114f and a second area of the side surface member 114b may operate as a second antenna element 114s.

The first PCB 142 may be spaced apart from the support member 114a. For example, as illustrated in the sectional view of FIG. 2B, the first PCB 142 and the support member 114a may be spaced apart from each other by a specific distance (e.g., "H"). Since the first PCB 142 and the support member 114a are spaced apart from each other, the first PCB 142 may be connected to the support member 114a through a solder 320 or a line. The first PCB 142 may be spaced apart from the support member 114a, or the first PCB 142 may be spaced apart from the shield layer 130 or a ground layer included in the second PCB 144 (or the third PCB 146). The support member 114a, the shield layer 130, and/or the ground layer included in the second PCB 144 (or the third PCB 146) may operate as the ground of a first antenna and a second antenna.

The first PCB 142 and the support member 114a may be electrically connected to each other through at least one or more contacts. For example, the first PCB 142 and the support member 114a may be electrically connected to each other through at least one or more of point 310a to point 310e. A switch disposed in the first PCB 142 may select at least one or more of point 310a to point 310e to selectively connect the first PCB 142 to the support member 114a.

The support member 114a may be electrically connected to the shield layer 130. Since the first PCB 142 and the support member 114a are electrically connected to each other and the support member 114a and the shield layer 130 are electrically connected to each other, the shield layer 130 may be a ground area of the first antenna and/or the second antenna. The first antenna may mean a first point 142a, a second point 142b, and an antenna including at least part of the first antenna element 114f. The second antenna may include a third point 142c, a fourth point 142d, and an antenna including at least part of the second antenna element 114s.

The first antenna element 114f may be connected to a first point 142a (i.e., a feeding point) and a second point 142b (i.e., a ground point) of the first PCB 142. The first point 142a may connect the communication circuit 160 to the first antenna element 114f and the second point 142b may connect the support member 114a to the first antenna element 114f. An antenna (a first antenna) including the first point 142a, the first antenna element 114f, and the second point 142b may radiate or receive a signal.

The second antenna element 114s may be connected to the third point 142c (i.e., a feeding point) and the fourth point 142d (i.e., a ground point) of the first PCB 142. The third point 142c may connect the communication circuit 160 to the second antenna element 114s. The fourth point 142d may connect the support member 114a to the second antenna element 114s. An antenna (i.e., a second antenna) including the third point 142c, the second antenna element 114s, and the fourth point 142d may radiate or receive a signal.

The first PCB 142 may be spaced apart from the support member 114a or the shield layer 130 by a specific distance H in the first direction. Since the first PCB 142 and the support member 114a are spaced apart from each other, a space in which a first antenna is capable of radiating a signal may be secured. For example, a radiation current supplied by the communication circuit 160 may flow through the first point 142a, the first antenna element 114f, the second point 142b, and the support member 114a. The attenuation amount of the radiation current may be reduced due to the spaced distance. In addition, if a spaced distance between the first PCB 142 and the support member 114a is present, the space in which the first antenna is capable of radiating a signal may be extended by the spaced distance. If the space in which the first antenna is capable of radiating a signal is extended, the radiation efficiency of the first antenna may increase. The details about the radiation efficiency of the first antenna will be applied to the second antenna.

The feeding point and the ground point may be changed. For example, as exemplified in FIG. 2B, the communication circuit 160 feeds the first antenna and the second antenna through the first point 142a and the third point 142c, respectively. However, the communication circuit 160 may also feed the first antenna and the second antenna through the second point 142b and the fourth point 142d, respectively. In this case, each of the first point 142a and the third point 142c may be the ground point.

Figure 2D:
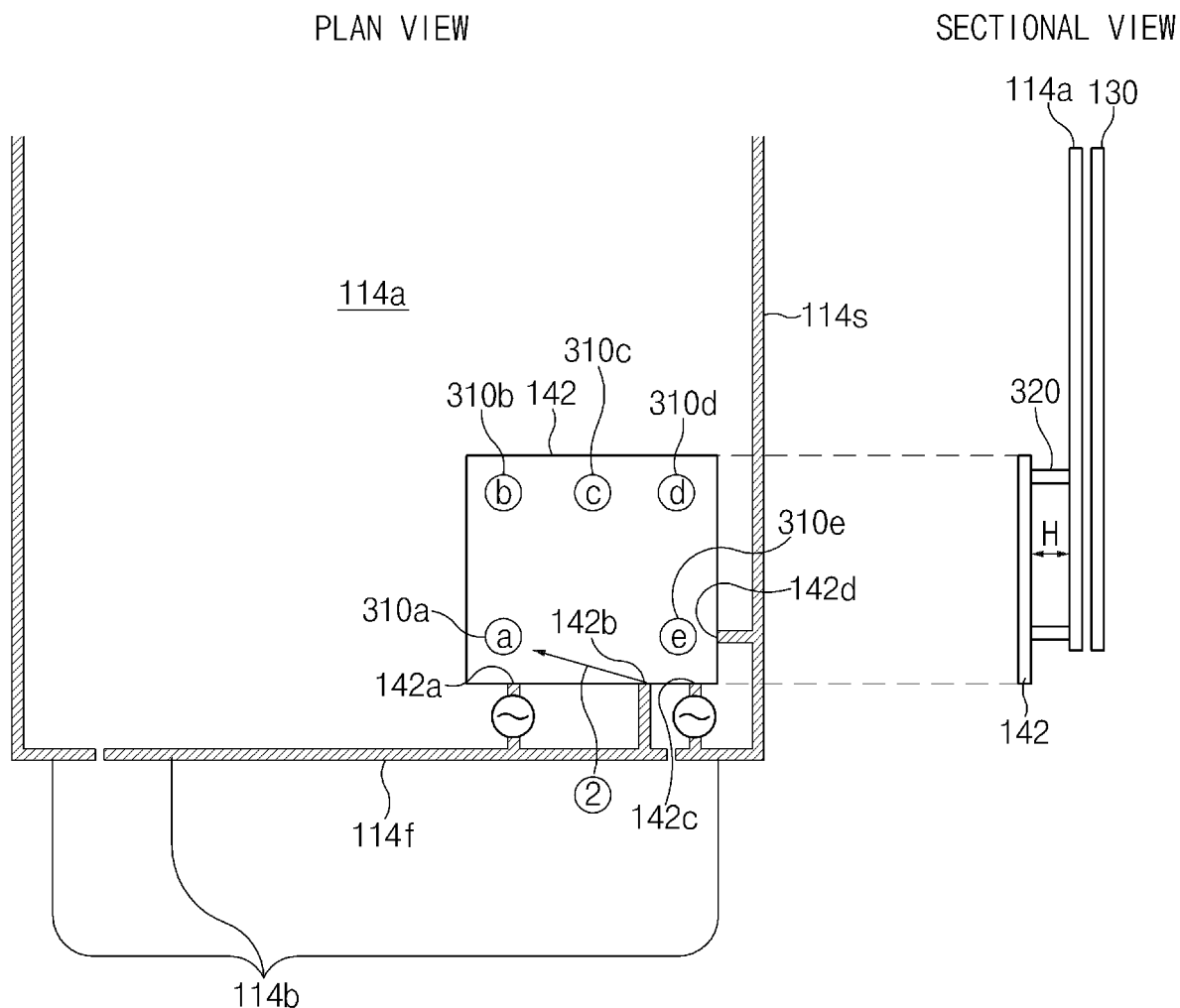
FIG. 2D illustrates a plan view and a sectional view of the electronic device, according to another embodiment.

FIG. 2D illustrates a plan view and a sectional view of the electronic device, according to an embodiment. Referring to FIGS. 2B and 2D, the shape of the first PCB 142 may be determined based on the location of another element of the electronic device. For example, in FIG. 2B, when the area of the first PCB 142 overlaps the area of a connection terminal 390 of an earphone, an opening may be included in the shape of the first PCB 142 by the area of the earphone connection terminal 390. In FIG. 2D, when the area of the first PCB 142 does not overlap the area of the connection terminal 390 of an earphone, there may be no opening in the first PCB 142.

Since a point at which an antenna (e.g., the first antenna or the second antenna) is grounded is changed depending on the shape of the first PCB 142, the electrical path of the antenna may also be changed. If the electrical path of the antenna is changed, the resonant frequency of the antenna may consequently be changed. For example, in FIG. 2B, when it is assumed that the first PCB 142 and the support member 114a are connected to each other through point 310a, the electrical path of the first antenna may be formed through a first path ①. In FIG. 2D, when it is assumed that the first PCB 142 and the support member 114a are connected to each other through point 310a, the electrical path of the first antenna may be formed through a second path ②. Since the electrical path of the first antenna illustrated in FIG. 2B is different from the electrical path of the first antenna illustrated in FIG. 2D, the resonant frequency of the first antenna illustrated in FIG. 2B may be different from the resonant frequency of the first antenna illustrated in FIG. 2D. According to an embodiment, the support member 114a may include a metal component, and operate as the ground of the first antenna when the support member 114a includes the metal component.

The electrical path of the first antenna may be changed depending on the shape of the ground layer inside the first PCB 142. For example, the ground layer of the first PCB 142 illustrated in FIG. 2B may be a shape in which opening is formed at the center of the ground layer, and the ground layer of the first PCB 142 illustrated in FIG. 2D may be a square shape. As such, the electrical path of the first antenna illustrated in FIG. 2B may be formed through the first path ① and the electrical path of the first antenna illustrated in FIG. 2D may be formed through the second path ②.

Figure 2E:
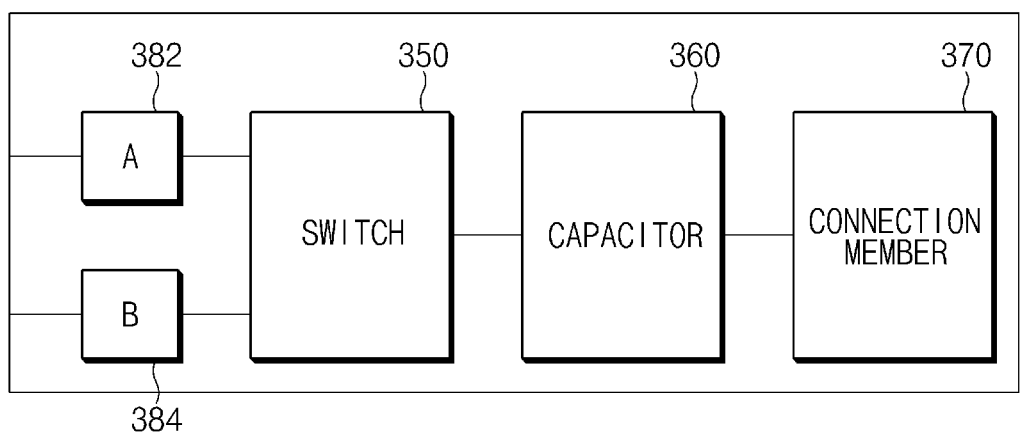
FIG. 2E is a block diagram of a structure in which a ground layer in a first PCB and a ground area are connected to each other, according to an embodiment.
Figure 2F:
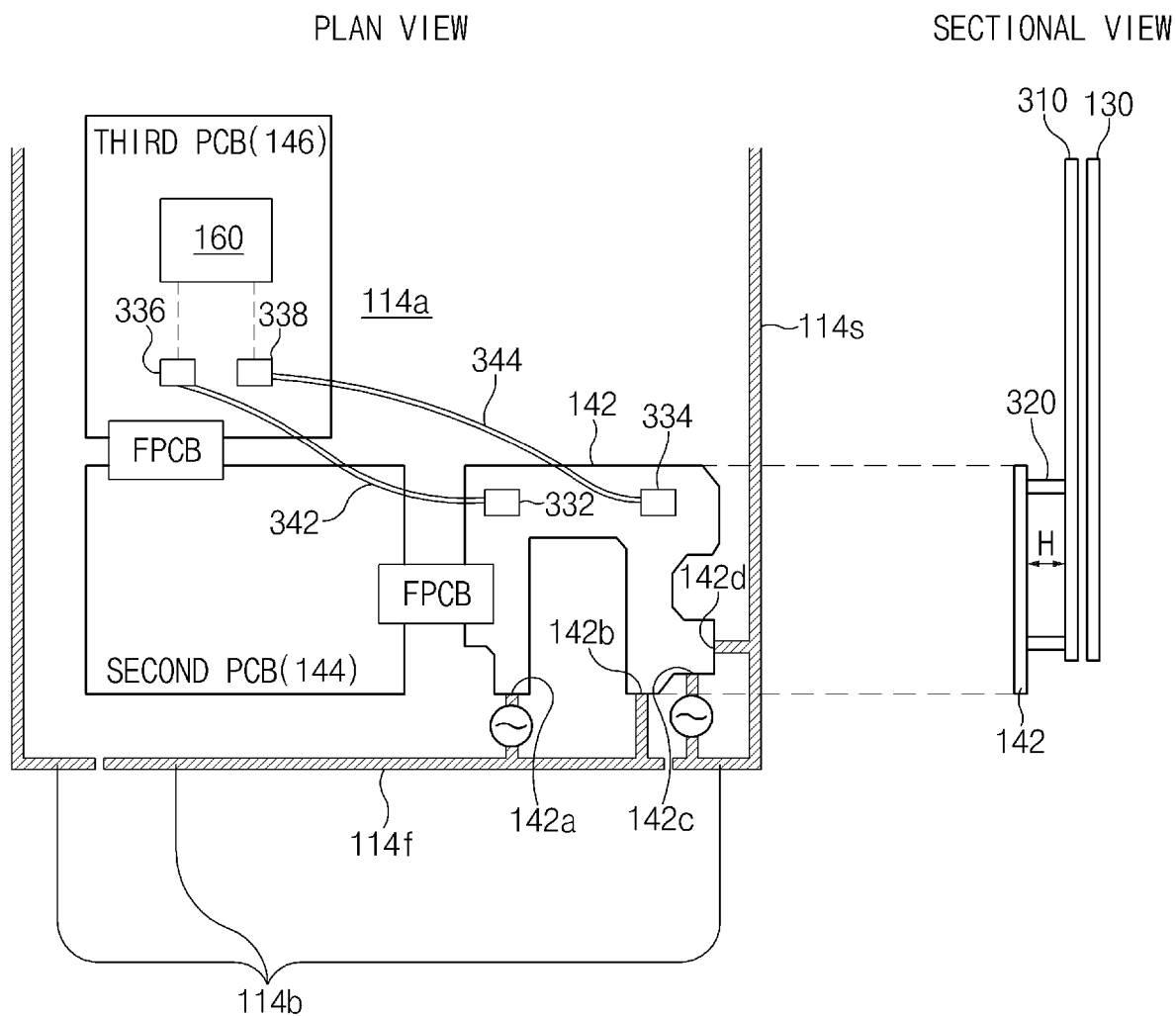
FIG. 2F illustrates a block diagram of a first printed circuit board (PCB) and a third PCB that are connected to each other through a receptacle and transmission line, according to an embodiment.
Figure 2G:
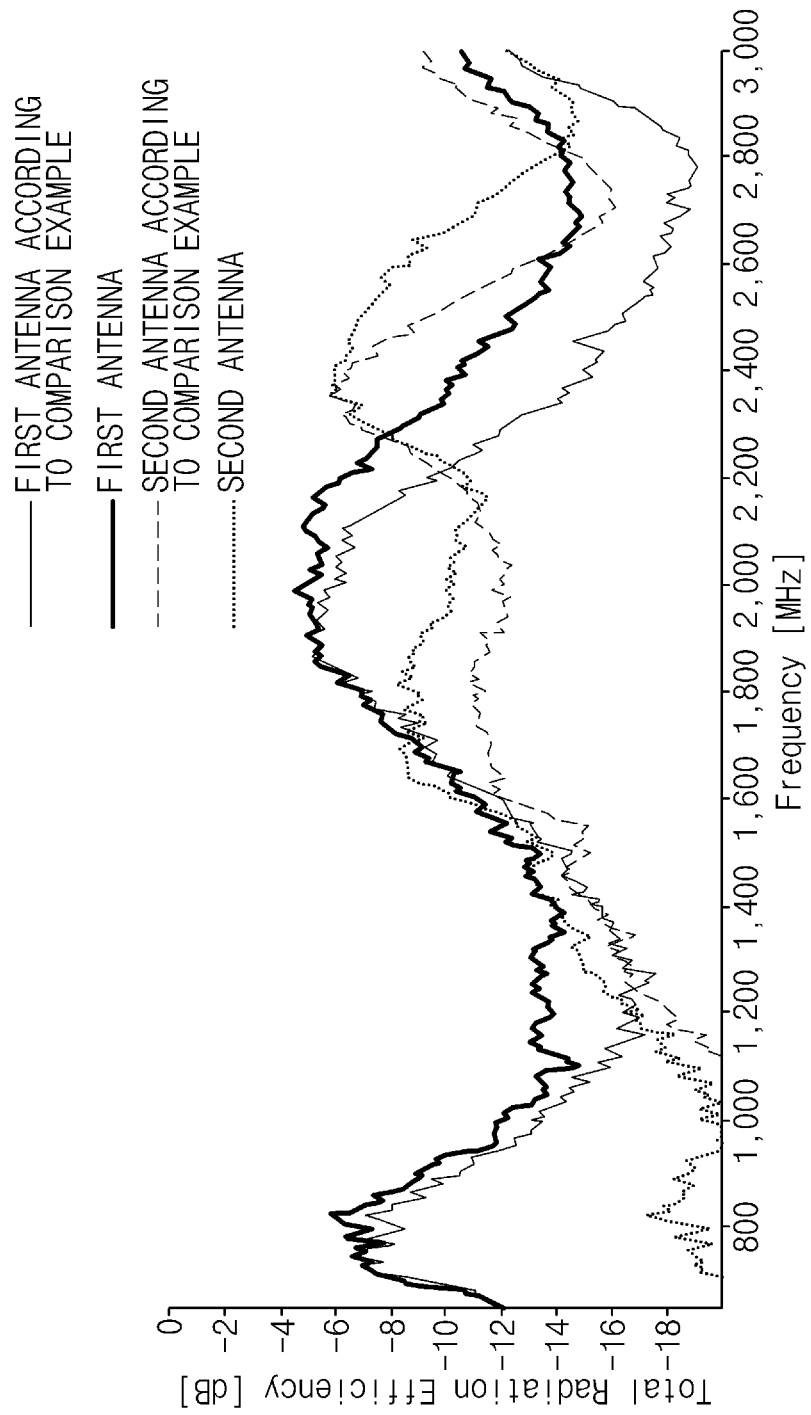
FIG. 2G is a graph illustrating radiation efficiency of each of a first antenna and a second antenna, according to an embodiment.

FIG. 2E is a block diagram of a structure in which a ground layer in a first PCB and a ground area are connected to each other, according to an embodiment. FIG. 2F illustrates a block diagram of a first PCB and a third PCB that are connected to each other through a receptacle and transmission line, according to an embodiment. FIG. 2G is a graph illustrating radiation efficiency of each of a first antenna and a second antenna, according to an embodiment.

According to an embodiment, the first antenna element 114f may be connected to the ground layer inside the first PCB 142. In a state where the first antenna element 114f is connected to the ground layer inside the first PCB 142, the first antenna element 114f may be connected to the ground area (e.g., the support member 114a or the shield layer 130) through each of points 310a, 310b, 310c, 310d, and 310e illustrated in FIG. 2B.

FIG. 2E is a block diagram of a structure usable in each of the points 310a, 310b, 310c, 310d, and 310e. Referring to FIG. 2E, each of points 310a, 310b, 310c, 310d, and 310e may include lumped elements 382 and 384, a switch 350, a capacitor 360, and a connection member 370 (e.g., a C-clip).

The lumped elements 382 and 384 may include an inductor or a capacitor. According to the embodiment in FIG. 2E, the two lumped elements 382 and 384 are included in each of the points 310a, 310b, 310c, 310d, and 310e. However, the lumped elements 382 and 384 may not necessarily be present in each of the points 310a, 310b, 310c, 310d, and 310e, or one of element A 382 and element B 384 may be included in each of the points 310a, 310b, 310c, 310d, and 310e.

The switch 350 (e.g., a single pole double pole (SPDP) switch or a single pole 4-pole (SP4P) switch) may be shorted or opened by the communication circuit 160. The switch 350 may be coupled to the lumped elements 382 and 384 so as to constitute a tunable circuit, or may be implemented in the form of one chip. Furthermore, the switch 350 may be referred to as a tunable element.

The switch 350 may change the connection path of the ground layer of the first PCB 142 and the ground area (e.g., the support member 114a or the shield layer 130) through the lumped elements 382 and 384 to finely adjust an electrical length. For example, the switch 350 may connect the ground layer of the first PCB 142 to the ground area through element A 382 or may connect the ground layer of the first PCB 142 to the ground area through element B 384. As such, the electrical path of the first antenna may be changed.

When a user's body directly contacts the electronic device 100, the capacitor 360 may prevent electric shock. For example, the capacitor 360 may prevent electric shock by blocking a current between the first antenna and the ground area and may perform impedance matching between the first antenna and the communication circuit 160.

The connection member 370 may be formed of a conductive material such as a C-clip, a conductive foam spring, a screw, or a solder, as an element, which connects the first PCB 142 to the support member 114a, or which connects the first PCB 142 to the shield layer 130.

Each of the points 310a, 310b, 310c, 310d, and 310e may include a structure connected in order of the capacitor 360, the switch 350, the lumped elements A and B 382 and 384, and the connection member 370 (e.g., C-clip). The structure may be a structure of a nonconductive area 542, in which a second switch 514 is disposed.

Referring to FIG. 2F, the first PCB 142 and the third PCB 146 may be connected to each other through a receptacle and a transmission line. For example, receptacles 332 and 334 may be disposed on point 310a to point 310e illustrated in FIG. 2B. The receptacle may be a connection member connecting the first PCB 142 to the third PCB 146. The receptacles 332 and 334 disposed on the first PCB 142 and receptacles 336 and 338 disposed on the third PCB 146 may be connected to each other through transmission lines 342 and 344.

Referring to FIG. 2G, the radiation efficiency of the first antenna (including the first point 142a, the second point 142b, and the first antenna element 114f) may increase in a low band (e.g., about 700 MHz to about 1000 MHz) or a high band (e.g., about 2200 MHz to about 3000 MHz). For example, the radiation efficiency of the first antenna may increase from about 800 MHz by 1 dB or more.

In the case of the second antenna, the radiation efficiency of the second antenna (including the third point 142c, the fourth point 142d, and the second antenna element 114s) may increase in a mid band (e.g., about 1600 MHz to about 2200 MHz) or a high band (e.g., about 2200 MHz to about 3000 MHz). For example, the radiation efficiency of the second antenna may increase from about 2600 MHz by 2 dB or more. Herein, when the first PCB 142 is attached to be adjacent to the support member 114a or the display 120, the first antenna and the second antenna may mean at least part of the side surface member 114b.

Figure 3A:
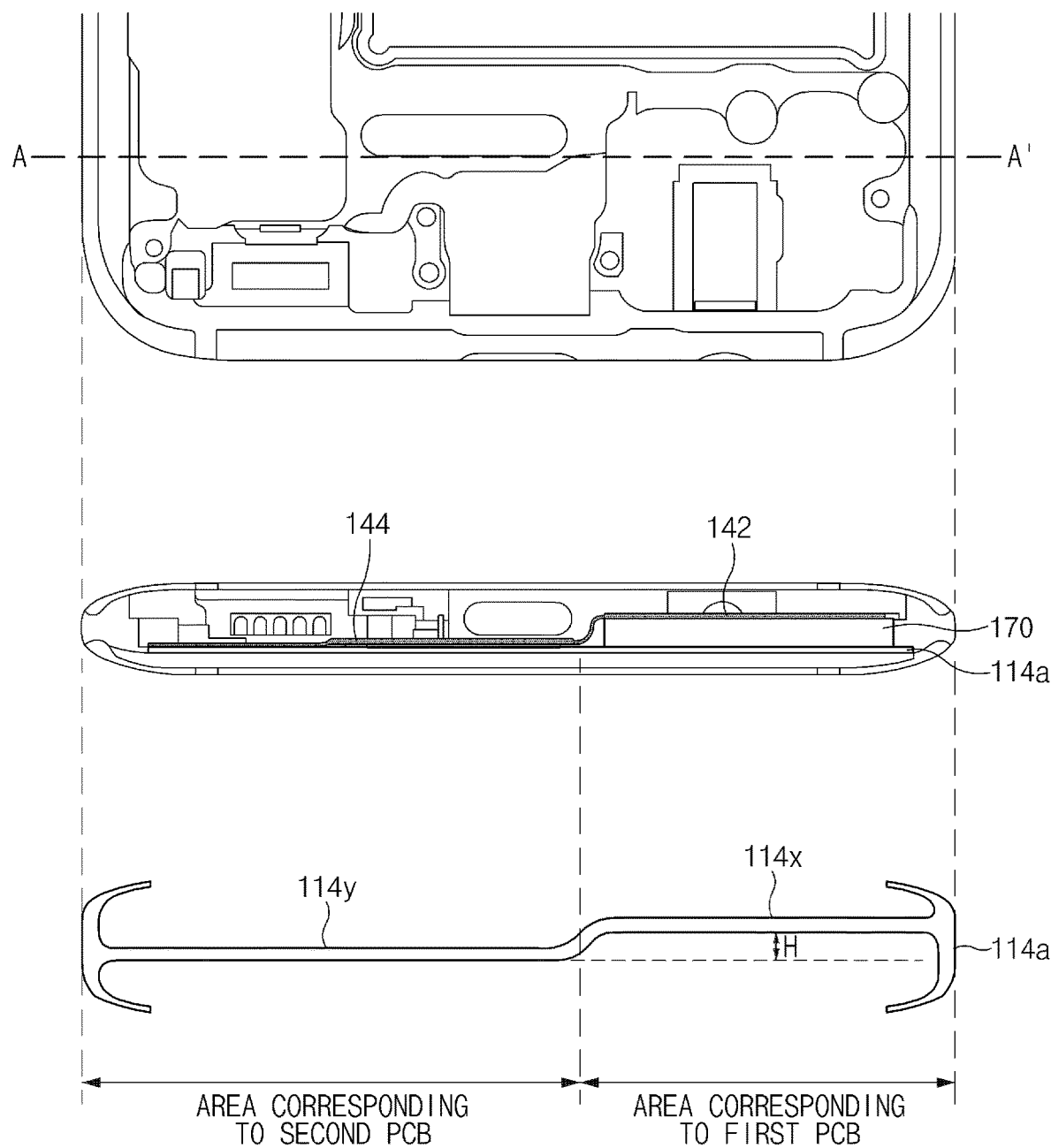
FIG. 3A is a sectional view of an electronic device and a housing, according to an embodiment.
Figure 3B:
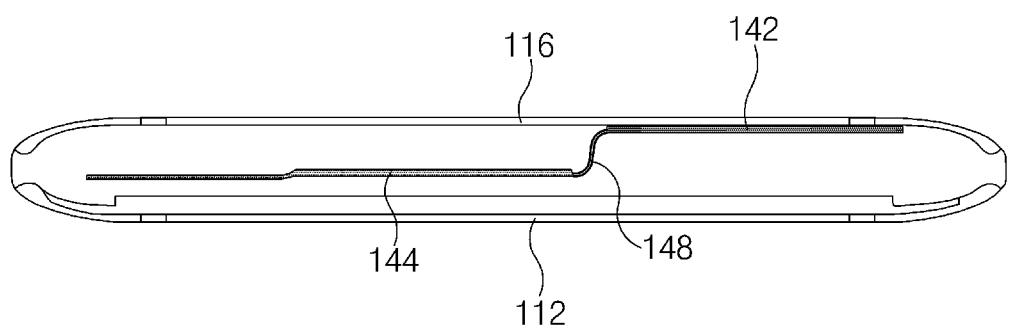
FIG. 3B is a sectional view of an electronic device, according to an embodiment.

FIG. 3A is a sectional view of an electronic device and a housing, according to an embodiment. FIG. 3B is a sectional view of an electronic device, according to an embodiment. The embodiments illustrated in FIGS. 3A and 3B refer to embodiments for spacing a distance between the first PCB 142 and the second PCB 144 (or a ground area).

Referring to FIG. 3A, a nonconductive material 170 (e.g., plastic) may be interposed between the support member 114a and the first PCB 142. Since the nonconductive material 170 is interposed between the support member 114a and the first PCB 142, the support member 114a and the first PCB 142 may have a spaced distance. The second PCB 144 may be disposed on the support member 114a. The first PCB 142 and a ground area (e.g., the shield layer 130) may have a spaced distance, and the second PCB 144 and the ground area may be more adjacent to each other than the spaced distance.

An area 114x corresponding to the first PCB 142 and an area 114y corresponding to the second PCB 144 may have a specified spaced distance difference H in the support member 114a. For example, when the support member 114a includes areas which are spaced apart from the shield layer 130 by a spaced distance difference, if the first PCB 142 and the second PCB 144 are respectively disposed in the areas, the first PCB 142 and the second PCB 144 may have the spaced distance difference H. Depending on the spaced distance difference, the first PCB 142 may be spaced apart from the ground area (e.g., the shield layer 130) by a spaced distance necessary for an antenna to radiate a signal.

The support member 114a may include a nonconductive material and a conductive material. For example, the area 114x corresponding to the first PCB 142 may be formed of the nonconductive material and the area 114y corresponding to the second PCB 144 may be formed of the conductive material for the purpose of grounding the second PCB 144.

According to an embodiment, the support member 114a may be formed by injection molding.

Referring to FIG. 3B, the first PCB 142 may be placed to be attached or adjacent to the back cover 116. For example, the first PCB 142 may be attached to the back cover 116 through an optical clear adhesive (OCA) film or an insulation tape. The second PCB 144 may be disposed on the support member 114a. Since the first PCB 142 is attached to the back cover 116, the first PCB 142 and the ground area may have the spaced distance necessary for an antenna to radiate a signal.

Figure 4A:
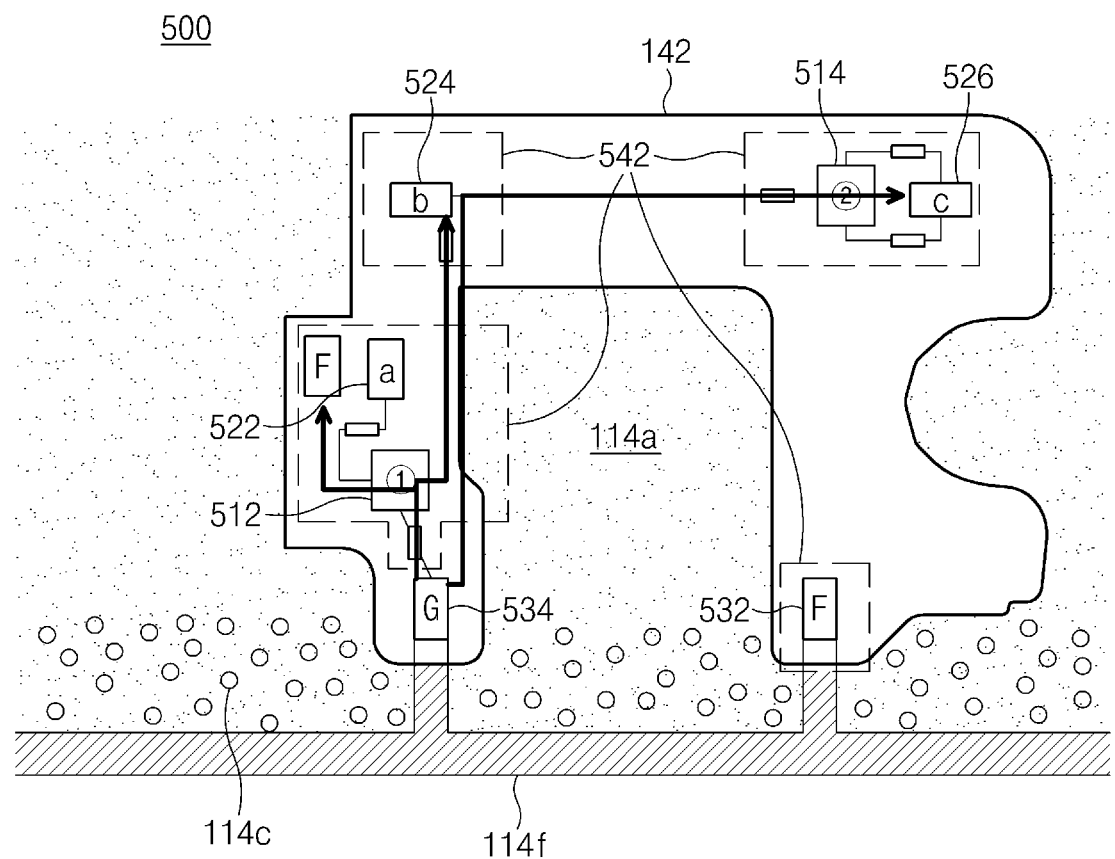
FIG. 4A illustrates an electronic device that changes an electrical path through switches, according to an embodiment.
Figure 4B:
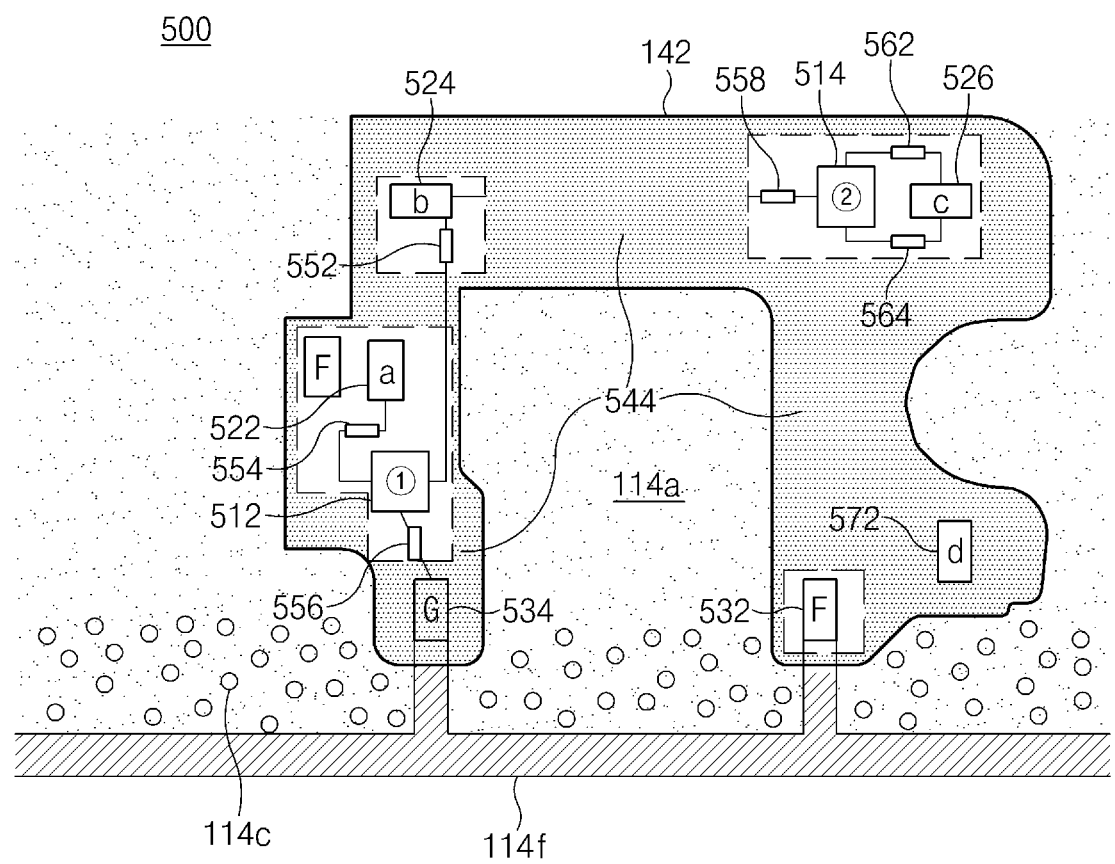
FIG. 4B illustrates a first PCB in which an area grounded through a support member is displayed, according to an embodiment.
Figure 4C:
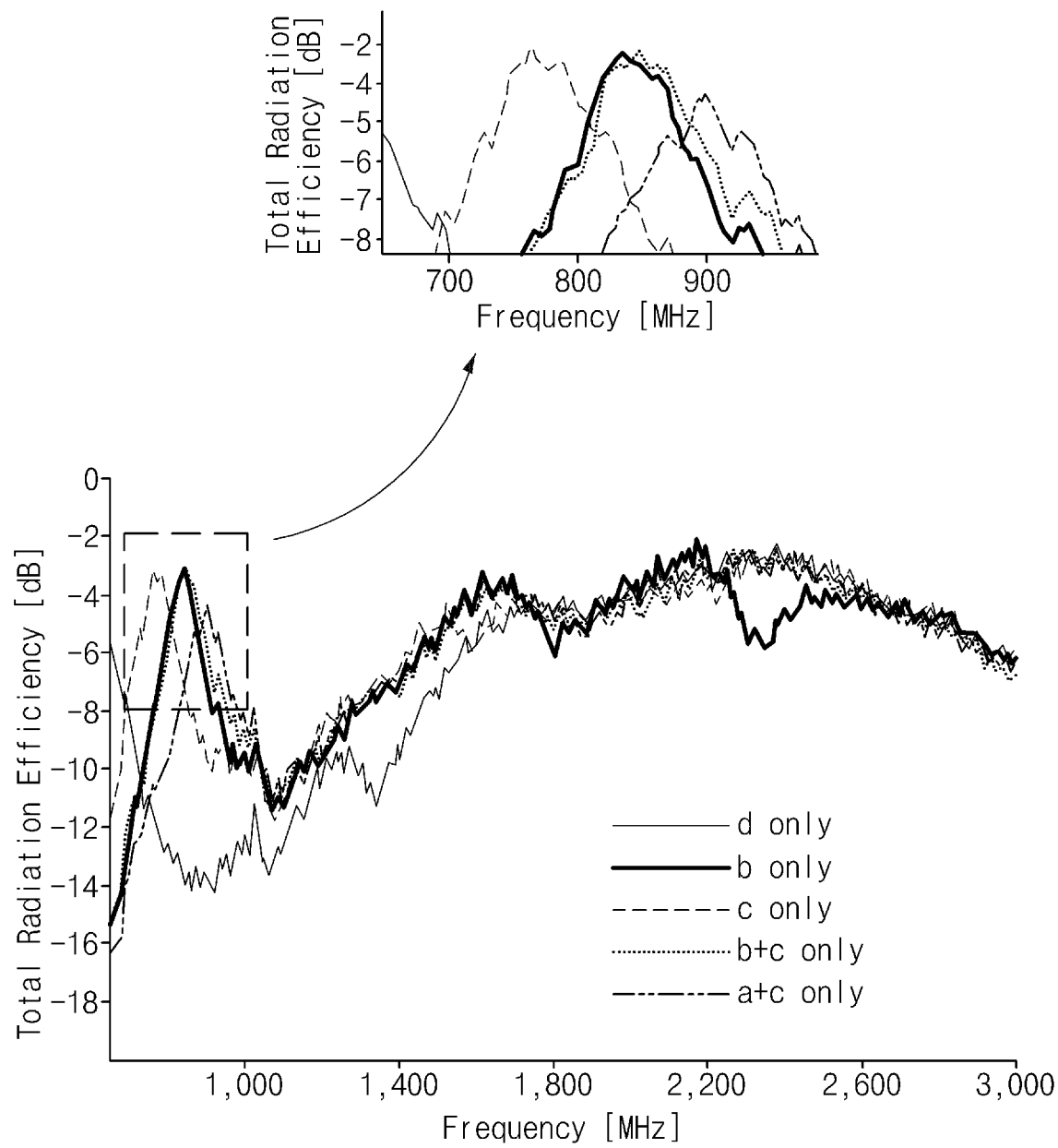
FIG. 4C illustrates radiation efficiency of a first antenna, according to an embodiment.

FIG. 4A illustrates an electronic device that changes an electrical path through switches, according to an embodiment. FIG. 4B illustrates a first PCB in which an area grounded through a support member is displayed, according to an embodiment. FIG. 4C illustrates radiation efficiency of a first antenna, according to an embodiment. The radiation efficiency illustrated in FIG. 4C refers to the radiation efficiency of a first antenna (including a first point 532, a second point 534, and the first antenna element 1140 illustrated in FIG. 4A.

Referring to FIGS. 4A and 4B, an electronic device 500 may include at least one or more switches 512 and 514. The at least one or more switches 512 and 514 may be placed on the first PCB 142. The switches 512 and 514 may change a ground point electrically connected to the first antenna element 114f. The first antenna element 114f may be connected to the first point 532 (or a feeding point) and the second point 534 (or a ground point) of the first PCB 142. The first point 532 may connect the communication circuit 160 to the first antenna element 114f. The second point 534 may be on a path on which the support member 114a and the first antenna element 114f are electrically connected to each other. The first antenna including the first point 532, the first antenna element 114f, and the second point 534 may transmit or receive a wireless RF signal.

The first switch 512 may change the ground point to which the first antenna element 114f is connected through the second point 534. For example, if the first switch 512 connects the second point 534 to point 522, the first point 532, the first antenna element 114f, the second point 534, and point 522 may be included in the first antenna. Alternatively, if the first switch 512 connects the second point 534 to point 524, then the first point 532, the first antenna element 114f, the second point 534, and point 524 may be included in the first antenna. The electrical length of the first antenna may be substantially changed based on the connection state of the at least one switch (e.g., the first switch 512 or the second switch 514).

The first switch 512 and the second switch 514 may connect the second point 534 to point 526. For example, the first switch 512 may connect the second point 534 to point 524, and the second switch 514 may connect point 524 to point 526.

As illustrated in FIG. 4B, the second switch 514 may directly connect the second point 534 to point 526. If the second point 534 and point 526 are connected to each other, a current may flow into the ground area (e.g., the support member 114a or the shield layer 130 in FIG. 2B) via the second point 534 and point 526.

The communication circuit 160 may feed the first antenna through the second point 534. In this case, the first point 532 may be the ground point, the second point 534 may be the feeding point, and the first point 532 may be connected to the ground area through one point of point 522, point 524, point 526, and point 572.

The support member 114a may include a nonconductive area and a conductive area. For example, an area 114c, which is adjacent to the first antenna element 114f, in the support member 114a may be the nonconductive area. The remaining area, other than the area, in the support member 114a may be the conductive area.

The first PCB 142 may include the nonconductive area 542 and a conductive area 544. The nonconductive area 542 may be an area in which various types of components of the first PCB 142 are disposed. The conductive area 544 may be an area, which is connected to the ground area (e.g., the support member 114a or the shield layer 130), in the first PCB 142. The conductive area 544 may be connected to the second point 534 and may be connected to the ground area through one point of point 522, point 524, point 526, and point 572.

The nonconductive area 542 may include the switches 512 and 514, lumped elements 554, 562, and 564, and capacitors 552, 556, and 558. The switches 512 and 514 may connect the second point 534 to one point of point 522, point 524, and point 526. The switch 512 may connect the second point 534 to point 522 or point 524. The switch 514 may connect point 524 to point 526 through the element 562.

According to an embodiment, the switches 512 and 514 may be turned off. When the switches 512 and 514 are turned off, the second point 534 may be connected to the ground area via the conductive area 544 and point 572.

The lumped elements 552, 554, 562, and 564 may include an inductor or a capacitor. The lumped elements 552, 554, 562, and 564 on a path set by the switches 512, and 554 may be placed on an electrical path of an antenna in which the second point 534 and one of point 522, point 524, and point 526 are included. As such, the electrical path and the resonant frequency of the first antenna may be changed. In addition, the lumped elements 552, 554, 562, and 564 may match the impedance between an antenna and a ground area.

When a user's body directly contacts the electronic device, the capacitors 556 and 558 may prevent electric shock. The capacitors 556 and 558 may prevent electric shock by blocking a current between the first antenna and the ground area. The capacitors 556 and 558 may perform impedance matching between the first antenna and the communication circuit 160.

Referring to FIG. 4C, the resonant frequency of the first antenna may be changed depending on the point at which the first PCB 142 is connected to the ground area by a switching operation. For example, when the second point 534 is connected to the ground area through point 572, a distance from the second point 534 to the ground area may be longest, and thus the resonant frequency of the first antenna may be lower than the resonant frequency of another case. Referring to the case where the second point 534 is connected to the ground area through point 526, the distance from the second point 534 to the ground area may be shorter than the distance of the case where the second point 534 is connected to the ground area through point 572, and thus the resonant frequency of the first antenna may be higher (e.g., 800 MHz). Referring to the case where the second point 534 is connected to the ground area through point 524, the distance from the second point 534 to the ground area may be shorter than the distance of the case where the second point 534 is connected to the ground area through point 526, and thus the resonant frequency of the first antenna may be higher (e.g., 900 MHz).

The electrical path of the first antenna may be changed depending on the point at which the first PCB 142 is connected to the ground area by a switching operation, and thus, the resonant frequency of the first antenna may be changed. If the resonant frequency is changed, the radiation efficiency may increase in each resonant frequency, and thus, a bandwidth may be extended.

Figure 5A:
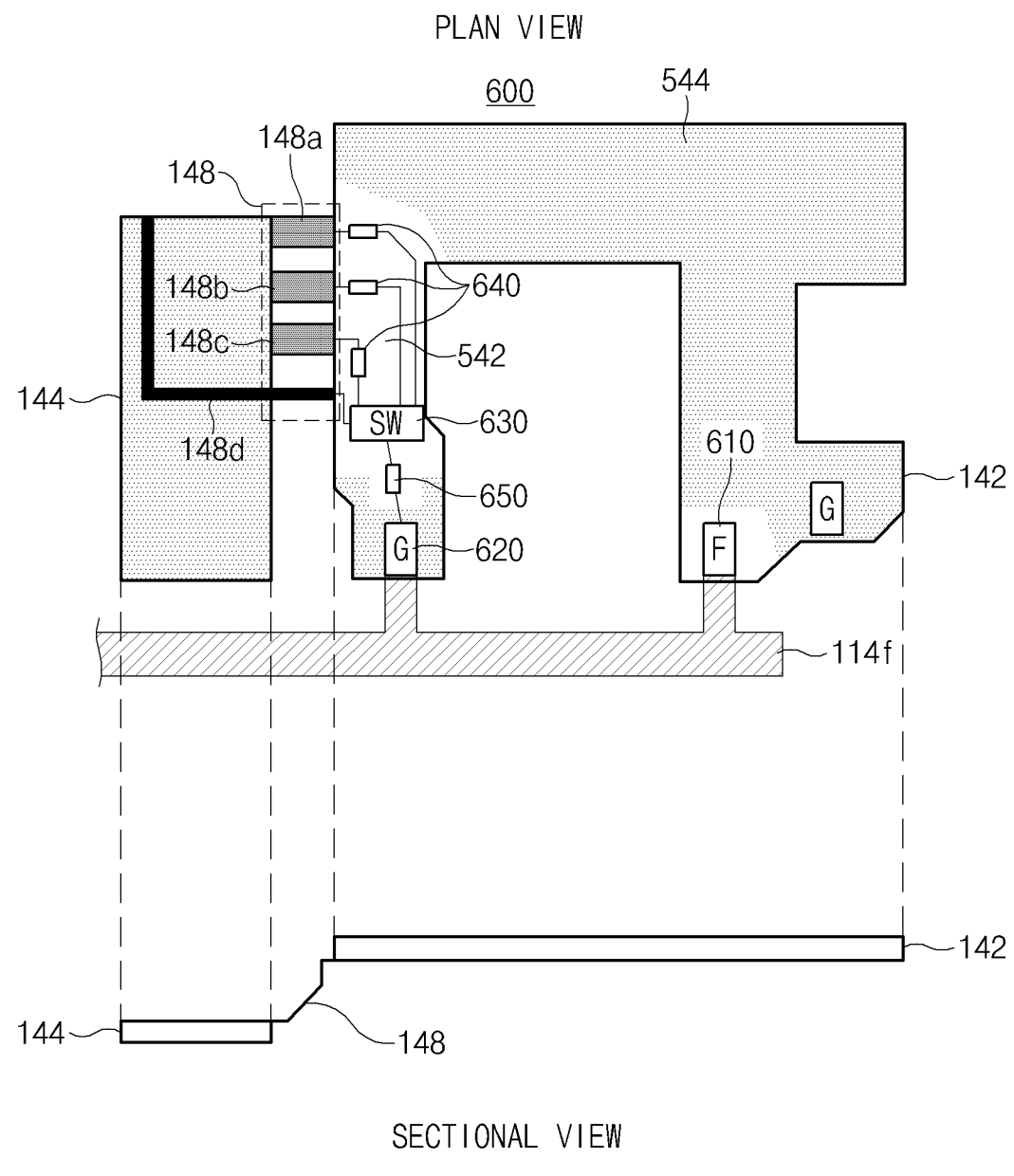
FIG. 5A illustrates an electronic device that changes an electrical path through a switch, according to an embodiment.
Figure 5B:
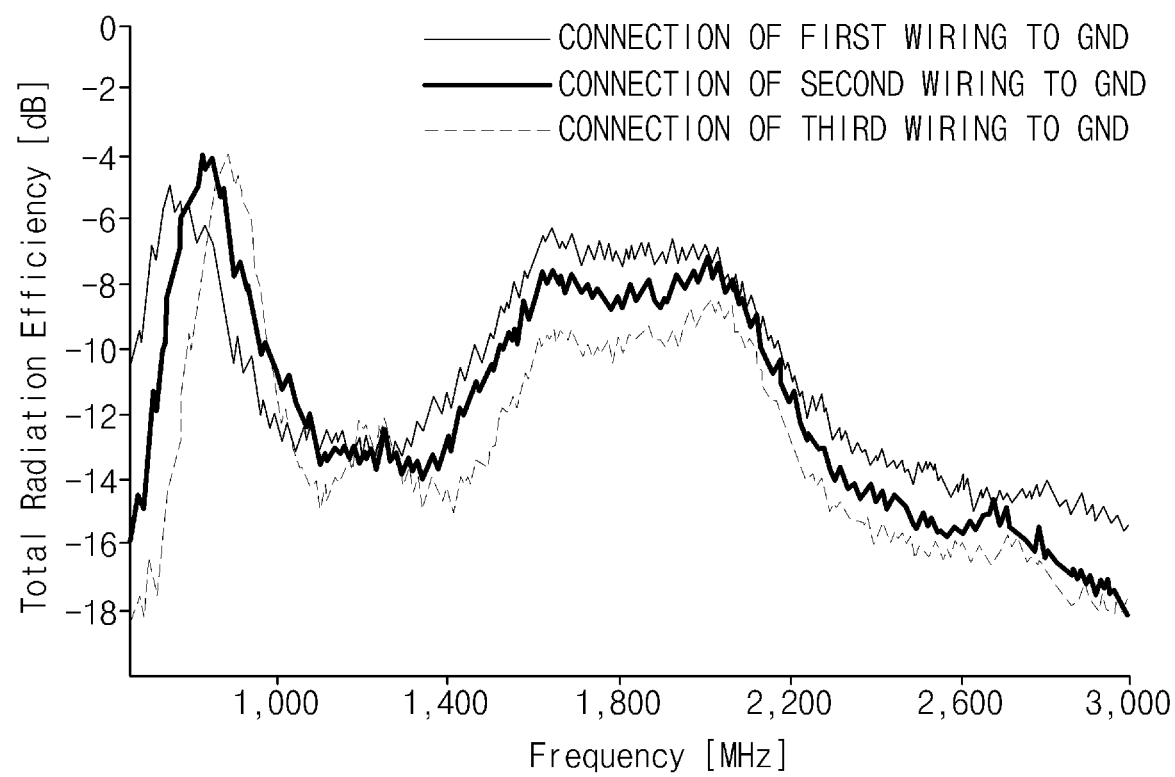
FIG. 5B illustrates radiation efficiency of a first antenna element, according to an embodiment.

FIG. 5A illustrates an electronic device that changes an electrical path through a switch, according to an embodiment. FIG. 5B illustrates radiation efficiency of a first antenna element, according to an embodiment. The radiation efficiency illustrated in FIG. 5B illustrates the radiation efficiency of an electronic device 600 illustrated in FIG. 5A.

Referring to FIG. 5A, a switch 630 may change a path (e.g., a ground path) between a second point 620 (e.g., a ground point) and the ground layer of the second PCB 144. For example, the communication circuit 160 illustrated in FIG. 1 may supply a radiation current through a first point 610. The radiation current supplied through the first point 610 may flow into a ground area through the first antenna element 114f and the second point 620. At this time, the switch 630 may change the ground path. If the switch 630 connects the second point 620 to a first wiring 148a, the radiation current may flow into a ground area through the second point 620 and the first wiring 148a. If the switch 630 connects the second point 620 to a second wiring 148b, a current may flow into a ground area through the second point 620 and the second wiring 148b.

The FPCB 148 may include at least one or more wirings. The first to third wirings 148a to 148c may be wirings into which the radiation current flows. A fourth wiring 148d may be a wiring through which a signal for controlling the switch 630 is transmitted.

The first PCB 142 may include the nonconductive area 542 and the conductive area 544. The switch 630, a lumped element 640, and a capacitor 650 may be disposed in the nonconductive area 542. The switch 630, the lumped element 640, and the capacitor 650 may be the same as or similar to the switches 512 and 514, the lumped elements 552, 554, 562, and 564, and the capacitors 556 and 558 illustrated in FIGS. 4A and 4B.

Referring to FIG. 5B, the resonant frequency of the first antenna may be changed depending on the wiring connected to the second point 620. For example, when the second point 620 is connected to the first wiring 148a, the resonant frequency may be about 800 MHz. On the other hand, when the second point 620 is connected to the second wiring 148b, the resonant frequency may be about 900 MHz.

If the resonant frequency is changed, the radiation efficiency may be changed. For example, if the case where the first FPCB 148a is connected is compared with the case where the second FPCB 148b is connected, in a low band (e.g., about 600 MHz to about 1000 MHz), the radiation efficiency of the case where the second FPCB 148b is connected may be higher than the radiation efficiency of the case where the first FPCB 148a is connected. In a mid band (e.g., about 1700 MHz to about 2200 MHz) and a high band (e.g., about 2200 to about 3000 MHz), the radiation efficiency of the case where the second FPCB 148b is connected may be lower than the radiation efficiency of the case where the first FPCB 148a is connected.

If the case where the second FPCB 148b is connected is compared with the case where a third FPCB 148c is connected, in the low band, the radiation efficiency of the case where the third FPCB 148c is connected may be higher than the radiation efficiency of the case where the second FPCB 148b is connected. In the mid band and the high band, the radiation efficiency of the case where the third FPCB 148c is connected may be lower than the radiation efficiency of the case where the second FPCB 148b is connected.

Figure 6:
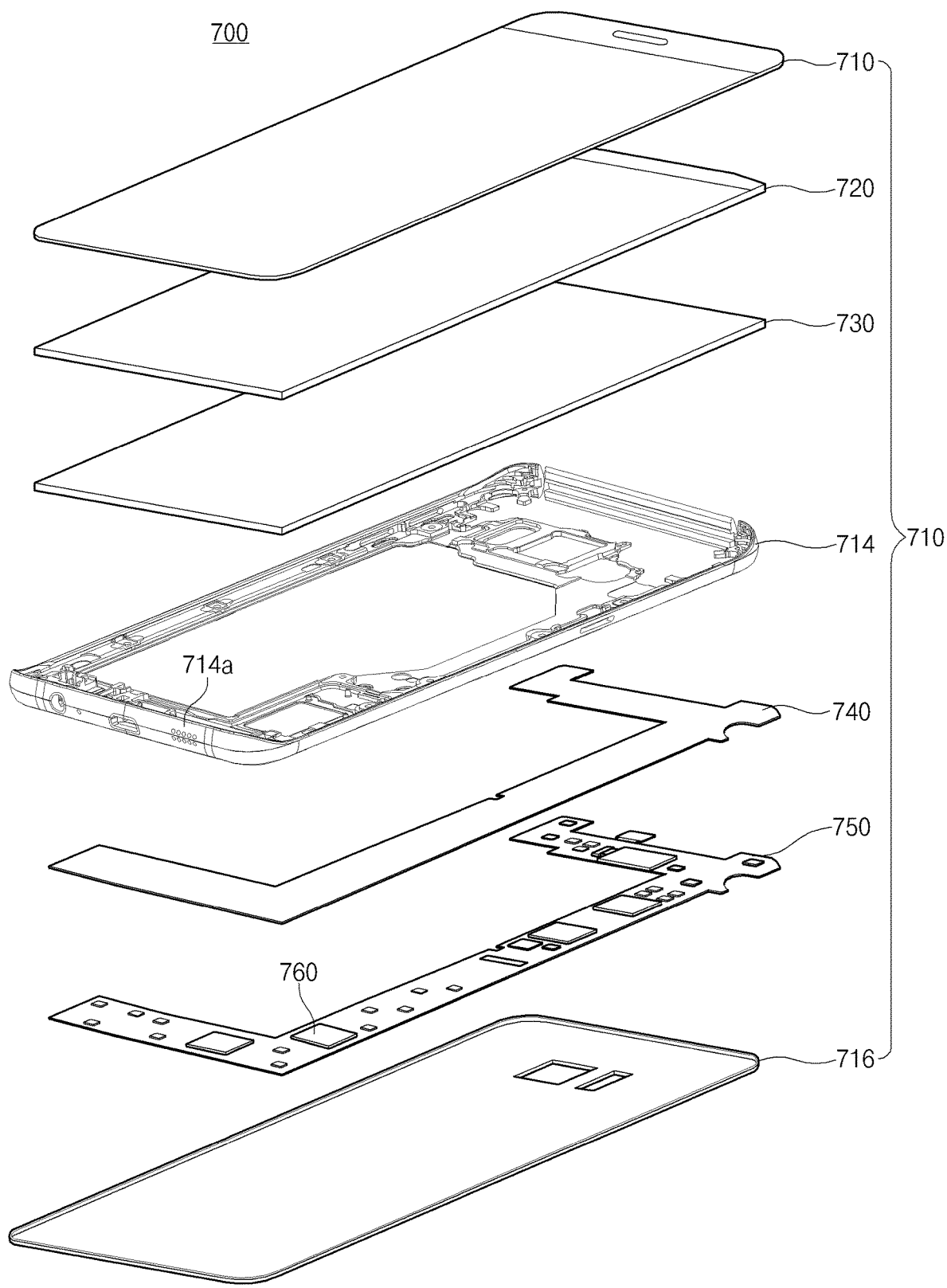
FIG. 6 illustrates an exploded perspective view of an electronic device, according to an embodiment.

FIG. 6 illustrates an exploded perspective view of an electronic device, according to an embodiment.

Referring to FIG. 6, an electronic device 700 may include a housing 710, a display 720, a shield layer 730, a nonconductive material 740, and a PCB 750. The housing 114, the display 120, and the shield layer 130 described in FIG. 1 may be substantially the same as the housing 710, the display 720, and the shield layer 730 illustrated in FIG. 6.

The PCB 750 may be implemented with one board. In this case, the PCB 750 may be disposed on one plane between a side surface member 714 and a back cover 716.

The nonconductive material 740 may be interposed between the side surface member 714 and the PCB 750. The nonconductive material 740 (e.g., plastic) may be an element for spacing a distance between the side surface member 714 and the PCB 750. If the nonconductive material 740 is interposed between the side surface member 714 and the PCB 750, the PCB 750 may be spaced apart from a ground area (e.g., the shield layer 730 or a support member included in side surface member 714) by a spaced distance.

If a spaced distance between the PCB 750 and the ground area is generated, a space necessary for an antenna element 714a included in the side surface member 714 to radiate a signal may be extended. The radiation current supplied by a communication circuit 760 may flow through the antenna element 714a, the PCB 750, and the ground area. If a spaced distance between the PCB 750 and the ground area is generated, the space necessary for the antenna element 714a to radiate a signal may be extended by the spaced distance. If the space necessary for the antenna element 714a to radiate a signal is extended, the radiation efficiency of the antenna element 714a may increase.

Figure 7A:
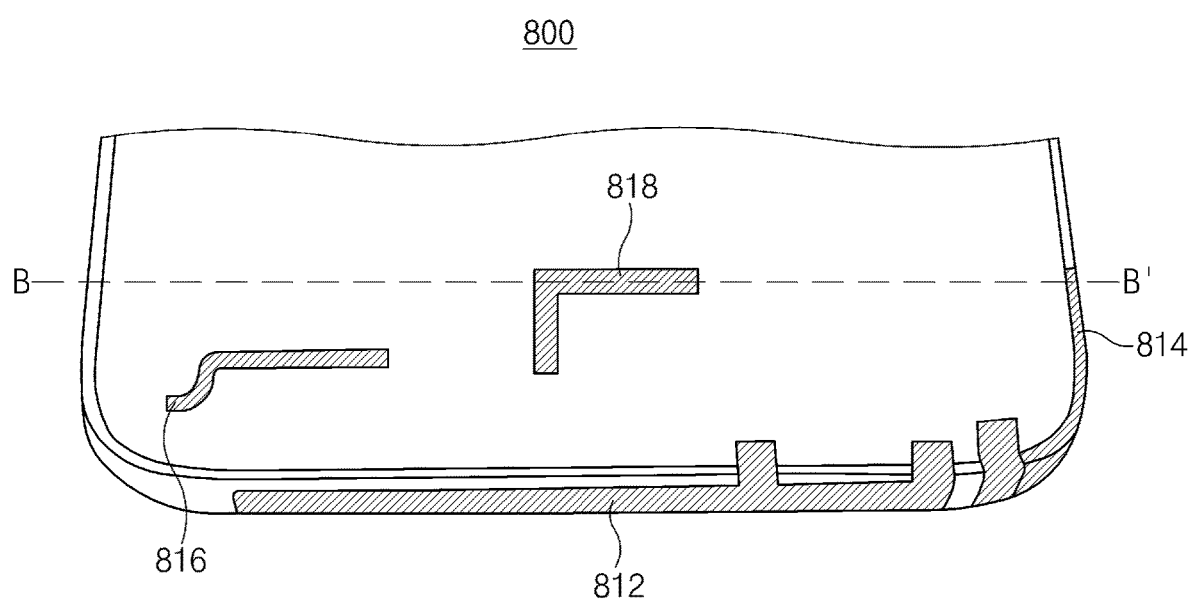
FIG. 7A is a plan view of an electronic device, according to an embodiment.
Figure 7B:
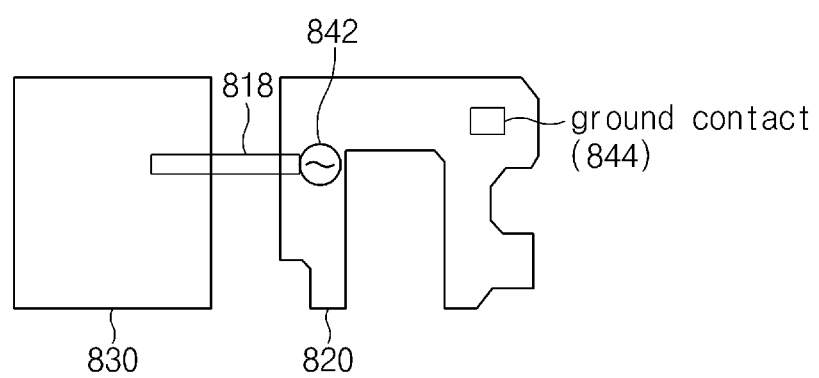
FIG. 7B is a plan view of a first PCB and a second PCB, according to an embodiment.
Figure 7C:
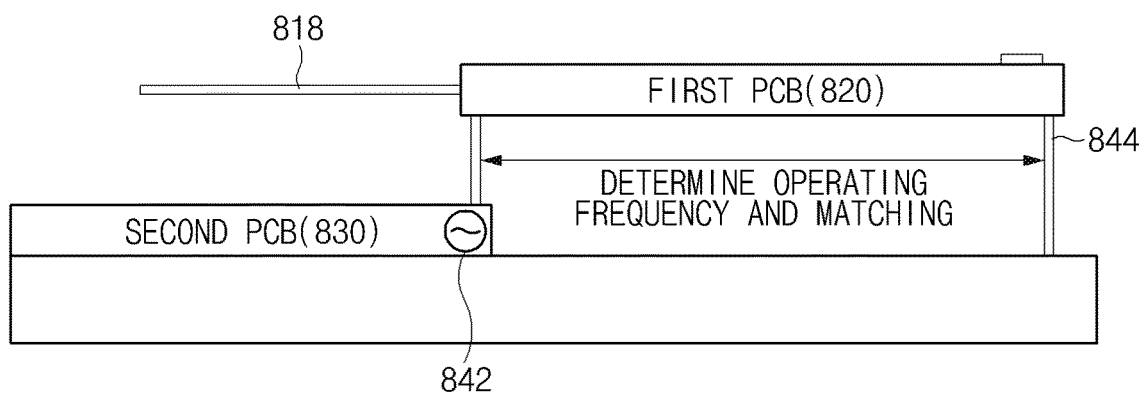
FIG. 7C is a sectional view of an electronic device, according to an embodiment.

FIG. 7A is a plan view of an electronic device, according to an embodiment. FIG. 7B is a plan view of a first PCB and a second PCB, according to an embodiment. FIG. 7C is a sectional view of an electronic device, according to an embodiment. The sectional view illustrated in FIG. 7C illustrates the cross-section B-B' of an electronic device 800 of FIG. 7A.

Referring to FIG. 7A, the electronic device 800 may include a first antenna element 812, a second antenna element 814, a third antenna element 816, and a fourth antenna element 818. The first antenna element 812 and the second antenna element 814 may include at least part of a side surface member. The third antenna element 816 and the fourth antenna element 818 may be mounted on the injection carrier structure inside a back cover. For example, each of the third antenna element 816 and the fourth antenna element 818 may be referred to as a laser direct structuring (LDS) antenna.

Referring to FIGS. 7B and 7C, the fourth antenna element 818 may be connected to a first PCB 820 and spaced apart from a second PCB 830. The first PCB 820 and the second PCB 830 may be connected to each other through a line. A communication circuit may be connected to a fourth antenna through a first point 842 (a feeding point). If the radiation current is supplied through the first point 842, the first point 842, the fourth antenna element 818, and a second point 844 (a ground point) may constitute the fourth antenna. When the structures illustrated in FIGS. 2B, 4A, 4B, and 5A are used, the location of the second point 844 may be changed. If the location of the second point 844 is changed, since a ground path is changed depending on the location of the second point 844, the resonant frequency and the radiation efficiency of the fourth antenna may also be changed.

According to an embodiment, an electronic device may include a cover glass, a display exposed through the cover glass, a housing for mounting the display, a first printed circuit board (PCB) and a second PCB that are disposed inside the housing, a back cover coupled to the housing, a first antenna element electrically connected to a ground area through the first PCB, and a communication circuit configured to feed the first antenna element and to transmit or receive a signal through the first antenna element. A spaced distance between the first PCB and the display may be longer than a spaced distance between the second PCB and the display.

The first PCB may include a switch to change an electrical path formed by the first antenna element and the ground area.

The housing may include a support member for supporting the first PCB and the second PCB. An area, which corresponds to the first PCB, in the support member and an area, which corresponds to the second PCB, in the support member may have a specified height difference.

The electronic device may further include a nonconductive material interposed between the housing and the first PCB.

The ground area may include at least one of a ground layer included in the second PCB, a shield layer interposed between the display and the first PCB, and a support member for supporting the first PCB and the second PCB.

The first antenna element may include at least part of the housing.

The first PCB and the second PCB may be electrically connected to each other through a FPCB.

The electronic device may further include a third PCB mounted in the housing. The second PCB electrically may connect the first PCB to the third PCB.

The electronic device may further include a second antenna element including at least part of the housing. The second antenna element and the ground area may be electrically connected to each other through the first PCB.

The communication circuit may transmit or receive a signal of a first frequency band through the first antenna element and may transmit or receive a signal of a second frequency band through the second antenna element.

The communication circuit may configured to feed the first antenna element through the first PCB and to transmit or receive the signal through an electrical path formed by the first PCB, the first antenna element, and the ground area.

According to an embodiment, an electronic device may include a cover glass, a display exposed through the cover glass, a housing for mounting the display, a back cover coupled to the housing, a first PCB placed between the housing and the back cover and disposed on a first plane, a second PCB disposed on a second plane placed between the first plane and the back cover and, an antenna element electrically connected to a ground area through the second PCB, and a communication circuit configured to feed the antenna element and to transmit or receive a signal through the antenna element.

The electronic device may further include a third PCB disposed in an area corresponding to a first area of the display on the first plane. The second PCB may be disposed on the second plane to at least partly overlap a second area of the display.

The communication circuit may be disposed on one of the first PCB, the second PCB, and the third PCB.

The first plane and the second plane may be parallel to each other, and the first plane and the second plane may have a specified spaced distance.

The electronic device may further include an adhesive material interposed between the second PCB and the back cover. The second PCB may be attached to the back cover by the adhesive material.

The first PCB may include a plurality of layers, and one of the plurality of layers may correspond to the ground area.

The ground area may correspond to a shield layer interposed between the display and the first plane.

The shield layer may shield electromagnetic interference generated between the display and the first and second PCBs.

The housing may include a metal area and a non-metal area, and at least part of the metal area may correspond to the ground area.

According to an embodiment, an electronic device may include a housing including a first plate, a second plate facing a direction opposite to the first plate, and a side surface member surrounding a space between the first plate and the second plate and including at least one conductive structure, a touch screen display exposed through a part of the first plate, a first PCB interposed between the display and the second plate, a wireless communication circuit mounted on the first PCB, at least one processor mounted on the first PCB, and a second PCB interposed between the display and the second plate and not overlapped with the first PCB when viewed from the top of the first plate. The second PCB may include a first plane and a second plane that are parallel to the first plate. A distance between the first plane and the first plate may be shorter than a distance between the second plane and the first plate. The second plane may include a conductive layer electrically connected to at least part of the conductive structure.

An electronic device may further include a conductive path disposed on the second plane. The conductive path may be electrically connected between the at least one conductive structure and the wireless communication circuit.

The conductive path may be electrically connected to the wireless communication circuit through one or more conductive wires.

The side surface member may include a first conductive portion, a second conductive portion, and an electrical insulation portion interposed between the first conductive portion and the second conductive portion. The electronic device may include a first conductive connection member interposed between the first conductive portion and a first point of the conductive layer and a second conductive connection member interposed between the second conductive portion and a second point of the conductive layer. The second point may be separated from the first point.

An electronic device may further include a third conductive connection member interposed between the first conductive portion and a part of the conductive path. The part of the conductive path may be placed between the first point and the second point when viewed from the top of the first plate.

An electronic device may further include a conductive connector interposed between the second plane and the second plate and exposed through a part of the side surface member.

The conductive connector may be mounted on the first plane.

An electronic device may further include an earphone jack, which is not overlapped with the conductive connector when viewed from the top of the first plate, which is interposed between the second plane and the second plate, and which is exposed through another part of the side surface member.

Figure 8:
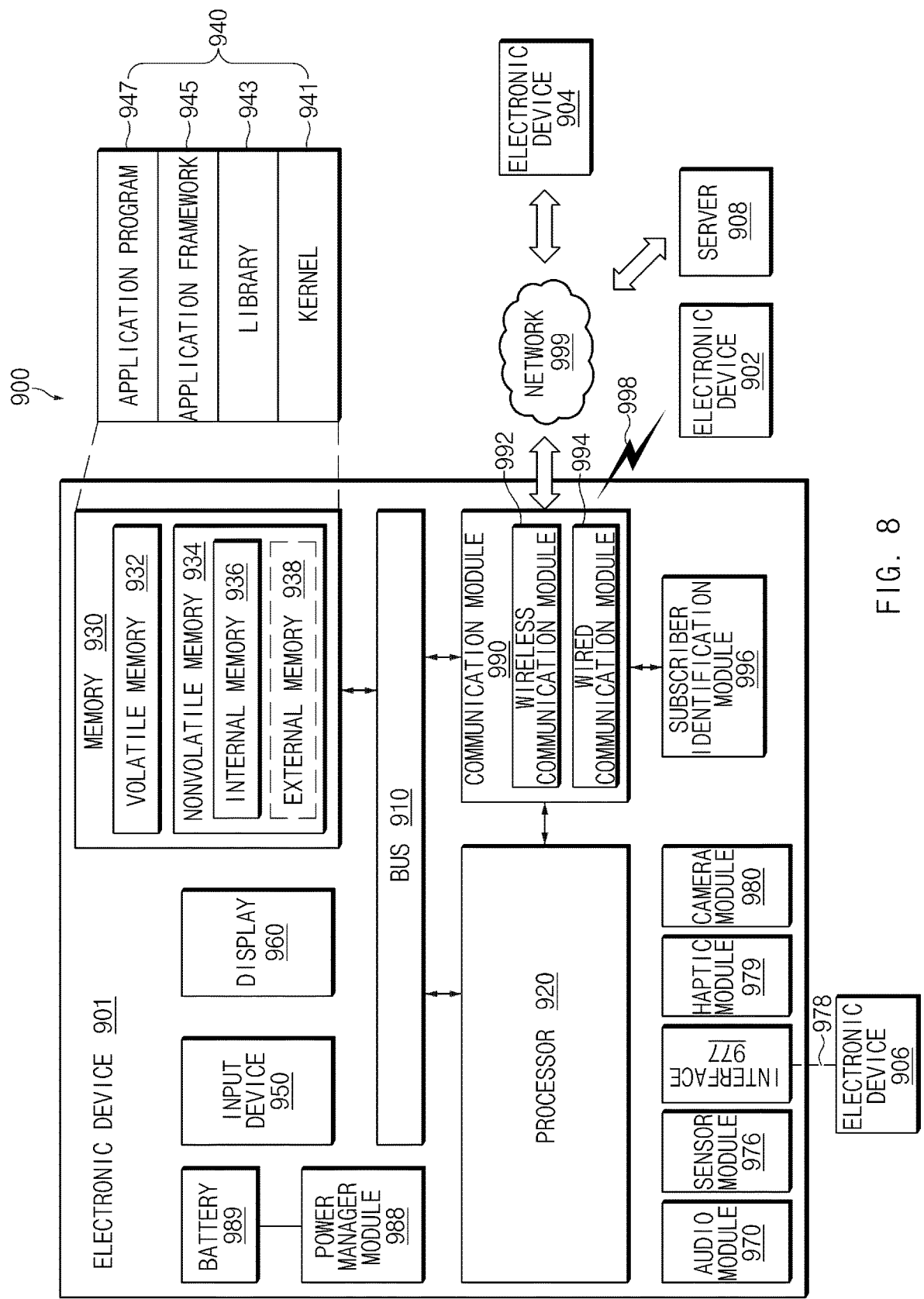
FIG. 8 is a block diagram illustrating an electronic device in a network environment, according to various embodiments.

FIG. 8 is a block diagram illustrating an electronic device 901 in a network environment 900, according to various embodiments. The electronic device 901 may include various types of devices including at least one of a portable communication device (e.g., a smartphone), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate monitor, blood glucose measurement device, blood pressure monitor, or a thermometer), a camera, or a wearable device. A wearable device may include at least one of an accessory type device (e.g., a timepiece, a ring, a bracelet, an anklet, a necklace, glasses, contact lenses, or a head-mounted device (HMD)), one-piece fabric or a clothes type device (e.g., electronic clothes), a body-attached type device (e.g., a skin pad or a tattoo), or a bio-implantable circuit. The electronic device may include at least one of televisions (TVs), digital versatile disc (DVD) players, audio devices, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

The electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or an Internet of things (IoT) device (e.g., a light bulb, a sprinkler device, a fire alarm, a thermostat, or a street lamp). The electronic device is not limited to the above-described devices. For example, similar to a smartphone having a function of measuring personal bio-information (e.g., heart rate information or blood glucose information), the electronic device may provide functions of multiple devices in a complex manner. In the disclosure, the term "user" used herein may refer to a person who uses the electronic device or may refer to a device (e.g., an artificial intelligence (AI) electronic device) that uses the electronic device.

Referring to FIG. 8, under the network environment 900, the electronic device 901 in the network environment 900 may communicate with an electronic device 902 through first network 998 or may communicate with an electronic device 904 or a server 908 through a network 999. According to an embodiment, the electronic device 901 may communicate with the electronic device 904 via the server 908.

The electronic device 901 may include a bus 910, a processor 920, a memory 930, an input device 950 (e.g., a micro-phone or a mouse), a display 960, an audio module 970, a sensor module 976, an interface 977, a haptic module 979, a camera module 980, a power management module 988, a battery 989, a communication module 990, and a subscriber identification module (SIM) 996. According to an embodiment, the electronic device 901 may not include at least one (e.g., the display 960 or the camera module 980) of the above-described elements or may further include other element(s).

The bus 910 may interconnect the above-described elements 920 to 990 and may include a circuit for conveying signals (e.g., a control message or data) between the above-described elements.

The processor 920 may include one or more of a central processing unit (CPU), an AP, a graphic processing unit (GPU), an image signal processor (ISP) of a camera or a CP. The processor 920 may be implemented with a system on chip (SoC) or a system in package (SiP). The processor 920 may drive an operating system (OS) or an application to control at least one other element (e.g., a hardware or software element) connected to the processor 920 and may process and compute various data. The processor 920 may load a command or data, which is received from at least one other element (e.g., the communication module 990), into a volatile memory 932 to process the command or data and may store the process result data into a nonvolatile memory 934.

The memory 930 may include the volatile memory 932 or the nonvolatile memory 934. The volatile memory 932 may include a random access memory (RAM) (e.g., a dynamic RAM (DRAM), a static RAM (SRAM), or a synchronous dynamic RAM (SDRAM)). The nonvolatile memory 934 may include a one time programmable read-only memory (OTPROM), a programmable read-only memory (PROM), an erasable programmable read-only memory (EPROM), an electrically erasable programmable read-only memory (EEPROM), a mask ROM, a flash ROM, a flash memory, a hard disk drive, or a solid-state drive (SSD). In addition, the nonvolatile memory 934 may be configured in the form of an internal memory 936 or the form of an external memory 938 which is available through connection only if necessary, according to the connection with the electronic device 901. The external memory 938 may further include a flash drive such as compact flash (CF), secure digital (SD), micro secure digital (Micro-SD), mini secure digital (Mini-SD), extreme digital (xD), a multimedia card (MMC), or a memory stick. The external memory 938 may be operatively or physically connected with the electronic device 901 in a wired manner (e.g., a cable or a universal serial bus (USB)) or a wireless (e.g., Bluetooth) manner.

The memory 930 may store at least one different software element, such as a command or data associated with the program 940, of the electronic device 901. The program 940 may include a kernel 941, a library 943, an application framework 945 or an application program (application) 947.

The input device 950 may receive a command or data to be used by other component (e.g., the processor 920) of the electronic device 901, from the outside (e.g., a user) of the electronic device 901. The input device 950 may include a microphone, a mouse, or a keyboard. The keyboard may be physically connected or virtually displayed through the display 960.

The display 960 may visually provide information to the outside (e.g., a user) of the electronic device 901. The display 960 may include a display, a hologram device or a projector, and a control circuit to control a relevant device. The screen may include a liquid crystal display (LCD), a light emitting diode (LED) display, an organic LED (OLED) display, a microelectromechanical systems (MEMS) display, or an electronic paper display. The display may be flexibly, transparently, or wearably implemented. The display may include a touch circuitry, which is able to detect a user's input such as a gesture input, a proximity input, or a hovering input or pressure sensor (a force sensor) able to measure the intensity of pressure by the touch. The touch circuit or the pressure sensor may be implemented integrally with the display or with at least one sensor separately from the display. The hologram device may show a stereoscopic image in a space using interference of light. The projector may project light onto a screen to display an image. The screen may be located inside or outside the electronic device 901.

The audio module 970 may convert a sound into an electrical signal or vice versa. The audio module 970 may acquire sound through the input device 950 (e.g., a microphone) or may output sound through an output device (e.g., a speaker or a receiver) included in the electronic device 901, the electronic device 902 (e.g., a wireless speaker or a wireless headphone) or an electronic device 906 (e.g., a wired speaker or a wired headphone) connected with the electronic device 901

The sensor module 976 may measure or detect an operational state (e.g., power or temperature) or an environmental state (e.g., an altitude, a humidity, brightness, or a state of a user) external to the electronic device 901 to generate an electrical signal or a data value corresponding to the information of the measured or detected state. The sensor module 976 may include at least one of a gesture sensor, a gyro sensor, an atmospheric pressure sensor, a magnetic sensor, an acceleration sensor, a grip sensor, a proximity sensor, a color sensor (e.g., a red, green, blue (RGB) sensor), an infrared (IR) sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or a UV sensor. The sensor module 976 may further include a control circuit for controlling at least one or more sensors included therein. The electronic device 901 may control the sensor module 976 by using the processor 920 or a processor (e.g., a sensor hub) separate from the processor 920. When the separate processor is used, while the processor 920 is in a sleep state, the electronic device 901 may operate without awakening the processor 920 to control at least a portion of the operation or the state of the sensor module 976.

The interface 977 may include a high definition multimedia interface (HDMI), a universal serial bus (USB), an optical interface, a recommended standard 232 (RS-232), a D-subminiature (D-sub), a mobile high-definition link (MHL) interface, an SD card/MMC (multi-media card) interface, or an audio interface. A connector 978 may physically connect the electronic device 901 and the electronic device 906. The connector 978 may include, for example, an USB connector, an SD card/MMC connector, or an audio connector (e.g., a headphone connector).

The haptic module 979 may convert an electrical signal into mechanical stimulation (e.g., vibration or motion) or into electrical stimulation. The haptic module 979 may apply tactile or kinesthetic stimulation to a user. The haptic module 979 may include a motor, a piezoelectric element, or an electric stimulator.

The camera module 980 may capture a still image and a moving picture. The camera module 980 may include at least one lens (e.g., a wide-angle lens, a telephoto lens, a front lens and a rear lens), an image sensor, an image signal processor, or a flash (e.g., a light emitting diode or a xenon lamp).

The power management module 988, which is to manage the power of the electronic device 901, may constitute at least a portion of a power management integrated circuit (PMIC).

The battery 989 may include a primary cell, a secondary cell, or a fuel cell and may be recharged by an external power source to supply power to at least one element of the electronic device 901.

The communication module 990 may establish a communication channel between the electronic device 901 and an external device (e.g., the first external electronic device 902, the second external electronic device 904, or the server 908). The communication module 990 may support wired communication or wireless communication through the established communication channel. The communication module 990 may include a wireless communication module 992 or a wired communication module 994. The communication module 990 may communicate with the external device through a first network 998 (e.g. a wireless local area network (WLAN) such as Bluetooth or Infrared Data Association (IrDA)) or a second network 999 (e.g., a WLAN such as a cellular network) through a relevant module among the wireless communication module 992 or the wired communication module 994.

The wireless communication module 992 may support cellular communication, local wireless communication, and global navigation satellite system (GNSS) communication. The cellular communication may include long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), a Beidou navigation satellite system (Beidou), or the European global satellite-based navigation system (Galileo). In the disclosure, "GPS" and "GNSS" may be interchangeably used.

When the wireless communication module 992 supports cellar communication, the wireless communication module 992 may identify or authenticate the electronic device 901 within a communication network using the SIM 996. The wireless communication module 992 may include a CP separate from the processor (e.g., an AP). In this case, the CP may perform at least a portion of the functions associated with at least one of elements 910 to 996 of the electronic device 901 for the processor 920 when the processor 920 is in an inactive (sleep) state, and together with the processor 920 when the processor 920 is in an active state. The wireless communication module 992 may include a plurality of communication modules, each supporting only a relevant communication scheme among cellular communication, short-range wireless communication, or a GNSS communication scheme.

The wired communication module 994 may include a local area network (LAN) service, a power line communication, or a plain old telephone service (POTS).

The first network 998 may employ Wi-Fi direct or Bluetooth for transmitting or receiving commands or data through wireless direct connection between the electronic device 901 and the first external electronic device 902. The second network 999 may include a telecommunication network (e.g., a computer network such as a LAN or a WAN, the Internet or a telephone network) for transmitting or receiving commands or data between the electronic device 901 and the second electronic device 904.

The commands or the data may be transmitted or received between the electronic device 901 and the second external electronic device 904 through the server 908 connected with the second network. Each of the external first and second electronic devices 902 and 904 may be a device for which the type is different from or the same as that of the electronic device 901. All or part of the operations that the electronic device 901 will perform may be executed by another or a plurality of electronic devices (e.g., the electronic devices 902 and 904 or the server 908). When the electronic device 901 executes any function or service automatically or in response to a request, the electronic device 901 may not perform the function or the service internally, but may, alternatively or additionally, transmit requests for at least a part of a function associated with the electronic device 901 to any other device. The other electronic device may execute the requested function or additional function and may transmit the execution result to the electronic device 901. The electronic device 901 may provide the requested function or service using the received result or may additionally process the received result to provide the requested function or service. To this end, cloud computing, distributed computing, or client-server computing may be used.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a housing for mounting the display;
a first printed circuit board (PCB) and a second PCB that are disposed inside the housing and the first PCB positioned along a first plane and the second PCB positioned along a second plane substantially parallel to the first plane, wherein the first PCB and the second PCB have a height difference in a direction substantially perpendicular to the first plane, and wherein the first PCB and the second PCB are electrically connected to each other through a flexible printed circuit board (FPCB);
a back cover coupled to the housing;
a support member disposed inside the housing, and disposed between the display and the first PCB and the second PCB, wherein the support member comprises a first area for supporting the first PCB and a second area for supporting the second PCB, the first area of the support member is connected to the second area of the support member;
a nonconductive material interposed between the first area of the support member and the first PCB, wherein an upper surface of the nonconductive material is higher than an upper surface of the second PCB based on an upper surface of the support member;
a first antenna element electrically connected to a surface of the first PCB, wherein the surface of the first PCB is positioned along the second plane; and
a communication circuit configured to feed the first antenna element through the first PCB and to transmit or receive a signal through the first antenna element,
wherein the first antenna element extends from a first point and a second point thereof,
wherein the first PCB comprises:
a conductive area extending along a length thereof,
a plurality of non-conductive areas positioned along the surface of the first PCB, and
a plurality of switches, with each switch of the plurality of switches positioned within a respective non-conductive area, with each non-conductive area positioned apart from another non-conductive area along the surface of the first PCB, and
wherein the first point of the first antenna element is positioned in a first non-conductive area of the plurality of non-conductive areas and the second point of the first antenna element is positioned in a part of the conductive area.

2. The electronic device of claim 1,
wherein each switch of the plurality of switches is configured to change an electrical path,
wherein the first point of the first antenna element is a feeding point and a second point of the first antenna element is a ground area, and
wherein an area of the first antenna element along the second plane overlaps an area of a second antenna element along the second plane.

3. The electronic device of claim 1, further comprising a ground area,
wherein the ground area includes a shield layer interposed between the display and the first PCB.

4. The electronic device of claim 1, further comprising:
a third PCB mounted in the housing,
wherein the second PCB electrically connects the first PCB to the third PCB.

5. The electronic device of claim 1, wherein the
second antenna element includes at least part of the housing, and
wherein the second antenna element and a ground area are electrically connected to each other through the first PCB.

6. The electronic device of claim 5, wherein the communication circuit is configured to:
transmit or receive a signal of a first frequency band through the first antenna element; and
transmit or receive a signal of a second frequency band through the second antenna element.

7. The electronic device of claim 1, wherein the communication circuit is configured to:
feed the first antenna element through the first point, forming an electrical path with the first PCB; and
transmit or receive the signal through the electrical path formed by the first PCB, the first antenna element, and a ground area.

8. The electronic device of claim 1, wherein the first area comprises nonconductive material and the second area comprises conductive material.

9. The electronic device of claim 1, wherein an area of the first PCB overlaps an area of a connection terminal.

10. The electronic device of claim 9, wherein the connection terminal is configured to connect an earphone.

11. The electronic device of claim 1, wherein the first antenna element is not disposed on the first PCB.

12. The electronic device of claim 1, wherein the first point of the first antenna element and the second point of the first antenna element connect to different parts of the first PCB.

13. The electronic device of claim 1, wherein a spaced distance between the first PCB and the display is longer than a spaced distance between the second PCB and the display based on the nonconductive material.

* * * * *